US012656976B1

(12) United States Patent　　(10) Patent No.:　US 12,656,976 B1
Islam et al.　　　　　　　　　　(45) Date of Patent:　　Jun. 16, 2026

(54) READ FOR NON-VOLATILE MEMORY WITH REDUCED CURRENT LEVELS

(71) Applicant: Sandisk Technologies, Inc., Milpitas, CA (US)

(72) Inventors: Sujjatul Islam, San Jose, CA (US); Jiahui Yuan, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/090,261

(22) Filed: Mar. 25, 2025

(51) Int. Cl.
　　G06F 3/00　　　　(2006.01)
　　G06F 3/06　　　　(2006.01)

(52) U.S. Cl.
　　CPC .......... G06F 3/0655 (2013.01); G06F 3/0604 (2013.01); G06F 3/0679 (2013.01)

(58) Field of Classification Search
　　None
　　See application file for complete search history.

(56) References Cited

U.S. PATENT DOCUMENTS

| | | | |
|---|---|---|---|
| 9,653,126 B2 | 5/2017 | Nguyen et al. |
| 10,290,343 B2 | 5/2019 | Kim et al. |
| 10,643,677 B2 | 5/2020 | Yabe |
| 11,417,400 B2 | 8/2022 | Lien et al. |
| 12,046,314 B2 | 7/2024 | Zainuddin et al. |
| 12,176,032 B2 | 12/2024 | Zainuddin et al. |
| 2012/0075931 A1 | 3/2012 | Jong |
| 2013/0194872 A1 | 8/2013 | Sim et al. |
| 2015/0301756 A1* | 10/2015 | Fang ........................ G11C 8/10 |
| | | | 711/103 |
| 2023/0317174 A1 | 10/2023 | Wang et al. |
| 2024/0412804 A1 | 12/2024 | Thoppa et al. |
| 2025/0291509 A1* | 9/2025 | Lee ....................... G06F 3/0655 |

OTHER PUBLICATIONS

International Search Report & The Written Opinion of the International Searching Authority dated Dec. 19, 2025, International Application No. PCT/US2025-035470.
U.S. Appl. No. 18/229,705, filed Aug. 3, 2023.

* cited by examiner

*Primary Examiner* — Midys Rojas
(74) *Attorney, Agent, or Firm* — Pearl Cohen Zedek Latzer Baratz LLP

(57)　　　　　　　ABSTRACT

Technology is disclosed herein for a storage system and method for reducing current levels while maintaining performance during a sensing operation. While initially ramping up and subsequently discharging the bias level on a selected word line, a selected bit line is set to float to thereby reduce current levels. The word line is then biased at a read voltage for a data state and, after being allowed to settle, the selected memory cell is sensed by determining the current though the selected memory cell. To improve performance, when the word line is biased at the read voltage, a voltage spike or kick is applied to selected bit line, after which it is biased at bit line sensing voltage while the selected word line settles and sensing occurs.

20 Claims, 25 Drawing Sheets

900

TRANSITION A WORDLINE VOLTAGE OF A WORDLINE ASSOCIATED WITH A TARGET MEMORY CELL OF THE SET OF MEMORY CELLS FROM A FIRST WORDLINE VOLTAGE LEVEL TO A SECOND WORDLINE VOLTAGE LEVEL.　902

SUBSEQUENT TO TRANSITIONING THE WORDLINE VOLTAGE TO THE SECOND WORDLINE VOLTAGE LEVEL, RAMP DOWN A BITLINE VOLTAGE OF A BITLINE ASSOCIATED WITH THE TARGET MEMORY CELL FROM A FIRST BITLINE VOLTAGE LEVEL TO A SECOND BITLINE VOLTAGE LEVEL.　904

PRIOR TO SENSING A STATE OF THE MEMORY CELL, RAMP UP THE BITLINE VOLTAGE LEVEL TO THE FIRST BITLINE VOLTAGE LEVEL.　906

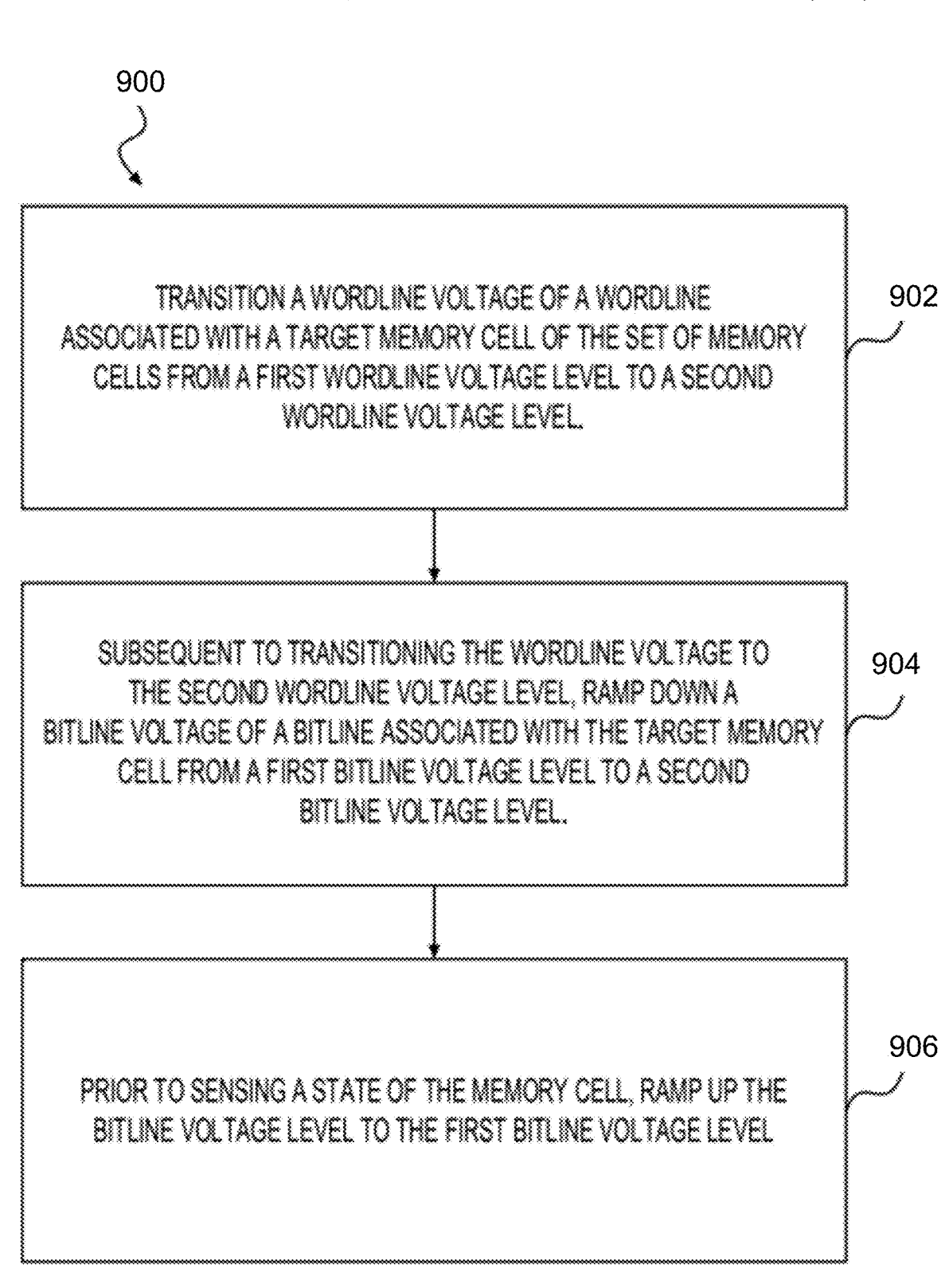

900

TRANSITION A WORDLINE VOLTAGE OF A WORDLINE ASSOCIATED WITH A TARGET MEMORY CELL OF THE SET OF MEMORY CELLS FROM A FIRST WORDLINE VOLTAGE LEVEL TO A SECOND WORDLINE VOLTAGE LEVEL.

902

SUBSEQUENT TO TRANSITIONING THE WORDLINE VOLTAGE TO THE SECOND WORDLINE VOLTAGE LEVEL, RAMP DOWN A BITLINE VOLTAGE OF A BITLINE ASSOCIATED WITH THE TARGET MEMORY CELL FROM A FIRST BITLINE VOLTAGE LEVEL TO A SECOND BITLINE VOLTAGE LEVEL.

904

PRIOR TO SENSING A STATE OF THE MEMORY CELL, RAMP UP THE BITLINE VOLTAGE LEVEL TO THE FIRST BITLINE VOLTAGE LEVEL

VBL ~ 0.5V

CUT OFF SELECT GATE VOLTAGE DURING WAITING
FOR WL SETTLING TO REDUCE ICC

BITLINE

SGD
OR LOW Rs
SG( DMY)

VSG~5V

CG
NSELECTED

VREAD~7V

CG
SELECTED

VREAD~7V

GR ~5V

WL SETTLING TIME

CR ~2V

VCELSRC

0V OR A FIXED VALUE (NEGATIVE SENSING)

ICC
EXPECTED)

ICC SAVING!

Figure 11:
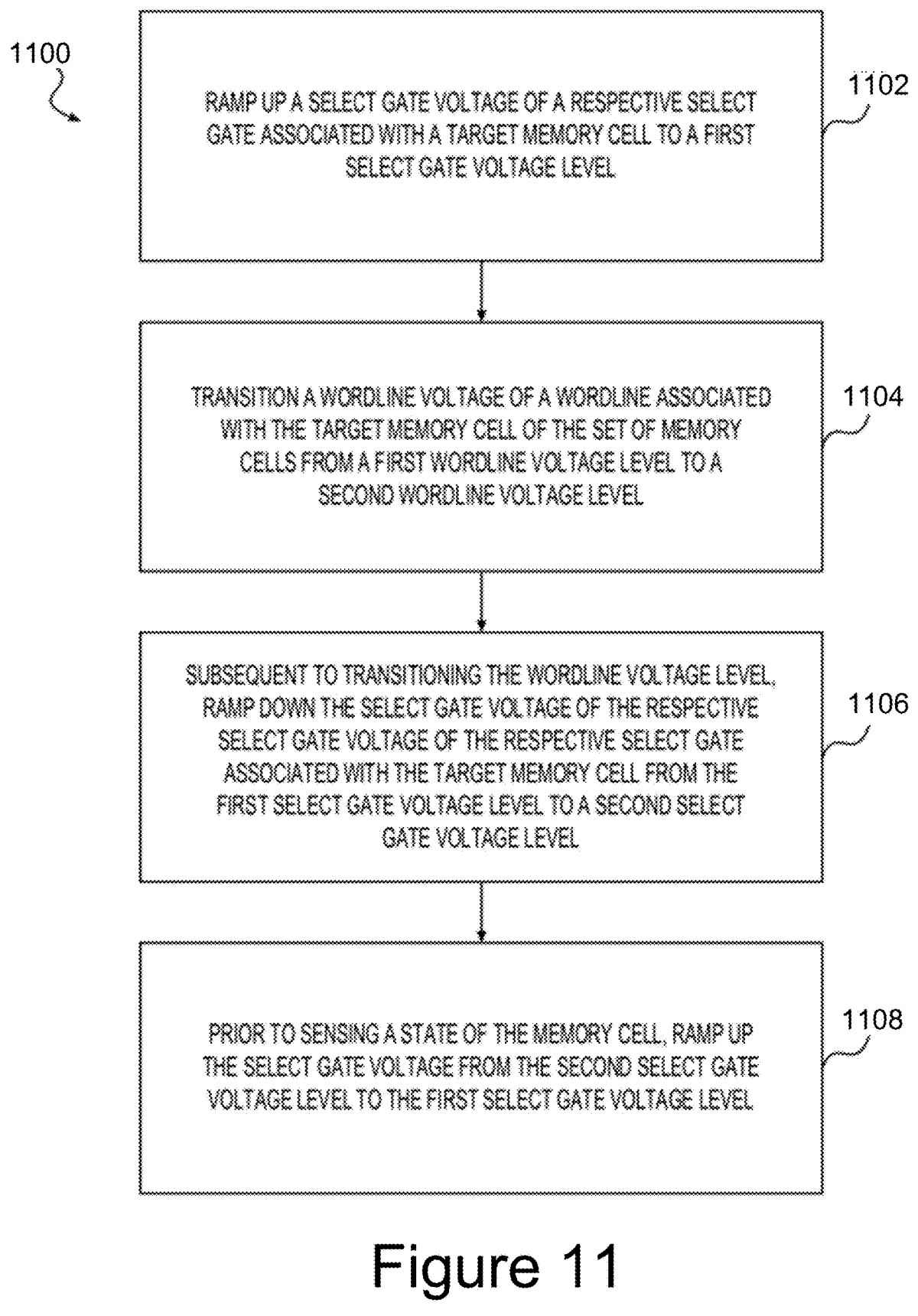

1100

1102
RAMP UP A SELECT GATE VOLTAGE OF A RESPECTIVE SELECT GATE ASSOCIATED WITH A TARGET MEMORY CELL TO A FIRST SELECT GATE VOLTAGE LEVEL

1104
TRANSITION A WORDLINE VOLTAGE OF A WORDLINE ASSOCIATED WITH THE TARGET MEMORY CELL OF THE SET OF MEMORY CELLS FROM A FIRST WORDLINE VOLTAGE LEVEL TO A SECOND WORDLINE VOLTAGE LEVEL

1106
SUBSEQUENT TO TRANSITIONING THE WORDLINE VOLTAGE LEVEL, RAMP DOWN THE SELECT GATE VOLTAGE OF THE RESPECTIVE SELECT GATE VOLTAGE OF THE RESPECTIVE SELECT GATE ASSOCIATED WITH THE TARGET MEMORY CELL FROM THE FIRST SELECT GATE VOLTAGE LEVEL TO A SECOND SELECT GATE VOLTAGE LEVEL

1108
PRIOR TO SENSING A STATE OF THE MEMORY CELL, RAMP UP THE SELECT GATE VOLTAGE FROM THE SECOND SELECT GATE VOLTAGE LEVEL TO THE FIRST SELECT GATE VOLTAGE LEVEL

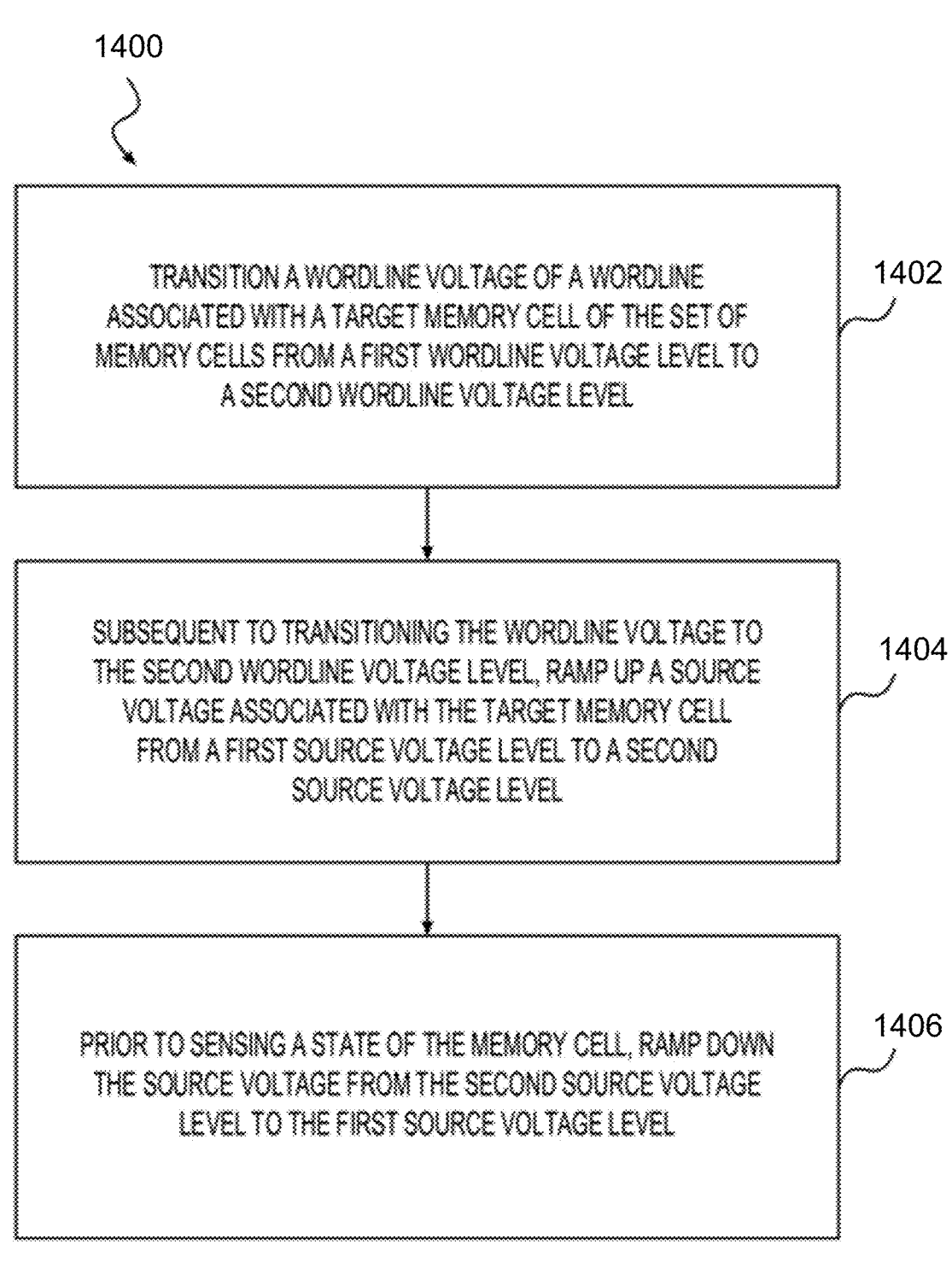

TRANSITION A WORDLINE VOLTAGE OF A WORDLINE ASSOCIATED WITH A TARGET MEMORY CELL OF THE SET OF MEMORY CELLS FROM A FIRST WORDLINE VOLTAGE LEVEL TO A SECOND WORDLINE VOLTAGE LEVEL

1402

SUBSEQUENT TO TRANSITIONING THE WORDLINE VOLTAGE TO THE SECOND WORDLINE VOLTAGE LEVEL, RAMP UP A SOURCE VOLTAGE ASSOCIATED WITH THE TARGET MEMORY CELL FROM A FIRST SOURCE VOLTAGE LEVEL TO A SECOND SOURCE VOLTAGE LEVEL

1404

PRIOR TO SENSING A STATE OF THE MEMORY CELL, RAMP DOWN THE SOURCE VOLTAGE FROM THE SECOND SOURCE VOLTAGE LEVEL TO THE FIRST SOURCE VOLTAGE LEVEL

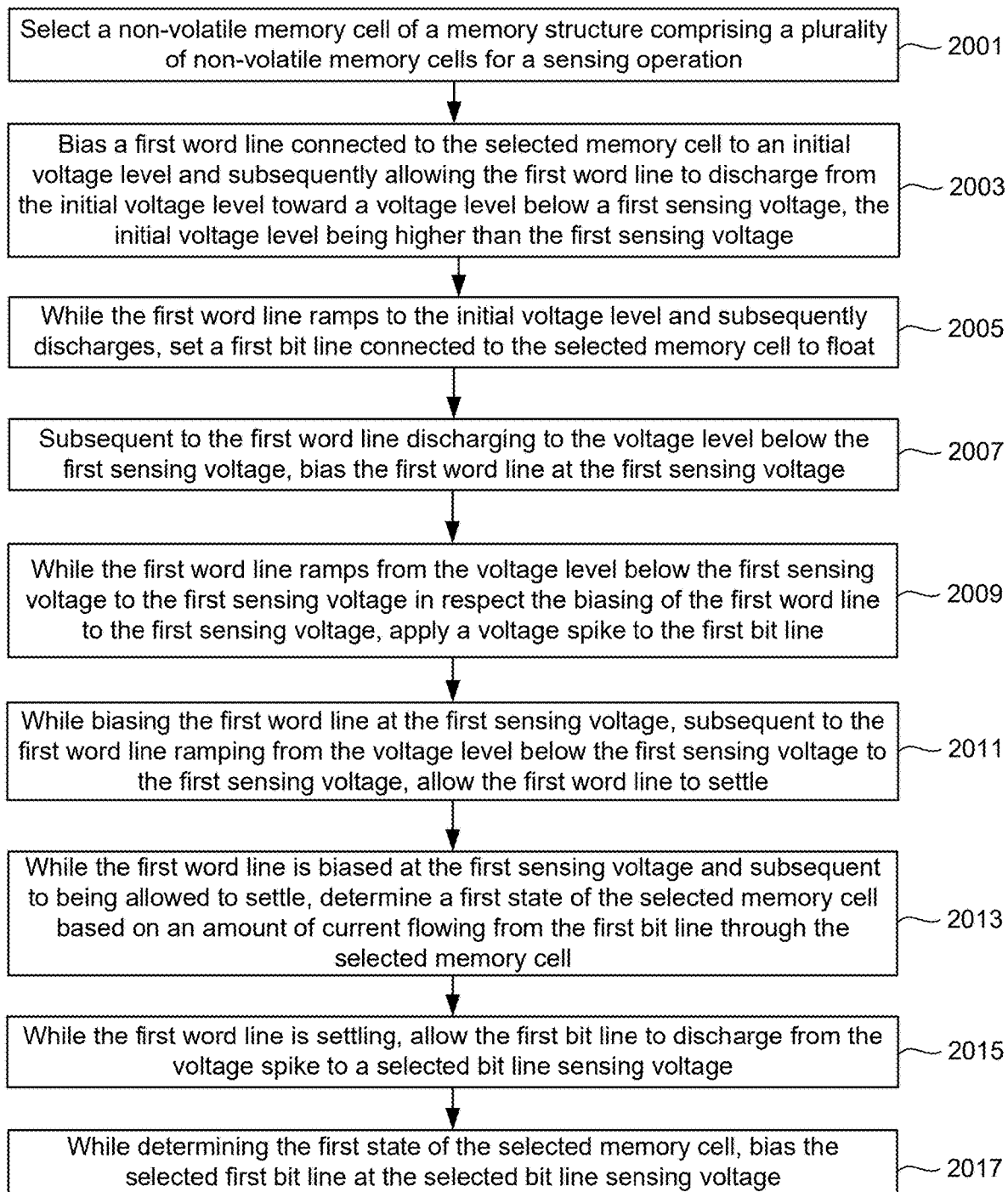

Select a non-volatile memory cell of a memory structure comprising a plurality of non-volatile memory cells for a sensing operation — 2001

Bias a first word line connected to the selected memory cell to an initial voltage level and subsequently allowing the first word line to discharge from the initial voltage level toward a voltage level below a first sensing voltage, the initial voltage level being higher than the first sensing voltage — 2003

While the first word line ramps to the initial voltage level and subsequently discharges, set a first bit line connected to the selected memory cell to float — 2005

Subsequent to the first word line discharging to the voltage level below the first sensing voltage, bias the first word line at the first sensing voltage — 2007

While the first word line ramps from the voltage level below the first sensing voltage to the first sensing voltage in respect the biasing of the first word line to the first sensing voltage, apply a voltage spike to the first bit line — 2009

While biasing the first word line at the first sensing voltage, subsequent to the first word line ramping from the voltage level below the first sensing voltage to the first sensing voltage, allow the first word line to settle — 2011

While the first word line is biased at the first sensing voltage and subsequent to being allowed to settle, determine a first state of the selected memory cell based on an amount of current flowing from the first bit line through the selected memory cell — 2013

While the first word line is settling, allow the first bit line to discharge from the voltage spike to a selected bit line sensing voltage — 2015

While determining the first state of the selected memory cell, bias the selected first bit line at the selected bit line sensing voltage — 2017

Figure 20

READ FOR NON-VOLATILE MEMORY WITH REDUCED CURRENT LEVELS

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. Herein, a memory system that uses non-volatile memory for storage may be referred to as a storage system. The memory structure may be three-dimensional (3D). One type of 3D structure has non-volatile memory cells arranged as vertical NAND strings. The 3D memory structure may be arranged into units that are commonly referred to as blocks. For example, a block in a NAND memory system contains many NAND strings. A NAND string contains memory cell transistors connected in series, a drain side select gate at one end, and a source side select gate at the other end. The memory cell transistor has a control gate. Each NAND string is associated with a bit line. The block typically has many word lines that provide voltages to the control gates of the memory cell transistors. In some architectures, each word line connects to the control gate of one memory cell on each respective NAND string in the block.

The memory cells are programmed one group at a time. Typically, the memory cells are programmed to a number of data states. Using a greater number of data states allows for more bits to be stored per memory cell. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell. Programming may include applying a program voltage to the control gate of the memory cell, followed by a verify operation that tests the Vt of the memory cell. Programming may continue in this manner until a target Vt is reached.

A selected memory cell on a NAND may be read by applying a read reference voltage to the control gate of the selected memory cell while applying a read pass voltage to the control gates of other memory cells ("unselected memory cells") on the NAND string. The read reference voltage will test whether the Vt of the memory cell is above/below the read reference voltage. The read pass voltage has a sufficiently high magnitude to be above the highest Vt of any of the unselected memory cells. Thus, the unselected memory cells should each turn on. The selected memory cell might or might not turn on and conduct a significant current, depending on its Vt. The bit line current may be sensed to determine the state of the selected memory cell. The amount of current drawn by the storage system during the read process will vary over time throughout the read. There could be large peaks in the current drawn by the storage system during certain parts of the read.

There are often limits to the peak current that can be provided from a host system to the storage system. The term "peak Icc" is used to refer to the peak amount of current that is drawn by the storage system. The term "Icc" is typically used to refer to a current provided to the storage system by a power source. The term "specified peak Icc" refers to a maximum allowed peak Icc. For example, there may be a specification that defines the specified peak Icc. If the peak current drawn by the storage system is greater than the specified peak Icc, then the magnitude of the supply voltage may drop, which can result in operation failure in the storage system. Much of the power and/or current that is used by the storage system is used to perform memory operations such as reading the memory cells on memory dies. Hence, the regulation of the power and/or current used by the memory dies is important in order to keep the peak Ice of the storage system within the specified peak Icc.

BRIEF DESCRIPTION OF THE DRAWINGS

Like-numbered elements refer to common components in the different figures.

FIG. 9 depicts a method for temporarily disabling bit line voltage for ICC savings during a sensing operation in accordance with embodiments described herein.

FIG. 11 depicts a method 1100 for temporarily disabling a low resistance select gate for ICC savings during a sensing operation, in accordance with embodiments described herein.

FIG. 14 depicts a method 1400 temporarily increasing source line voltage for ICC savings during a sensing operation, in accordance with embodiments described herein.

FIG. 20 is a flowchart for the operation of a non-volatile memory device that includes both the Read Icc savings technique and a bit link kick in a read operation.

DETAILED DESCRIPTION

Technology is disclosed herein for a non-volatile storage system and methods for its operation that can reduce current levels while maintaining performance during a sensing operation. While initially ramping up and subsequently discharging the bias level on a selected word line connected to a selected memory cell, the bit line of the selected memory cell is set to float to thereby reduce current levels. The word line is then biased at a read voltage for a data state and, after the word line is allowed to settle, the selected memory cell is sensed by determining the current though the selected memory cell with the corresponding word line biased at the read voltage. To improve performance, when the word line is biased at the read voltage, a voltage spike or kick is applied to selected bit line to more quickly establish voltage levels, after which the bit line is biased at bit line sensing voltage while the selected word line settles and sensing occurs.

Figure 1:
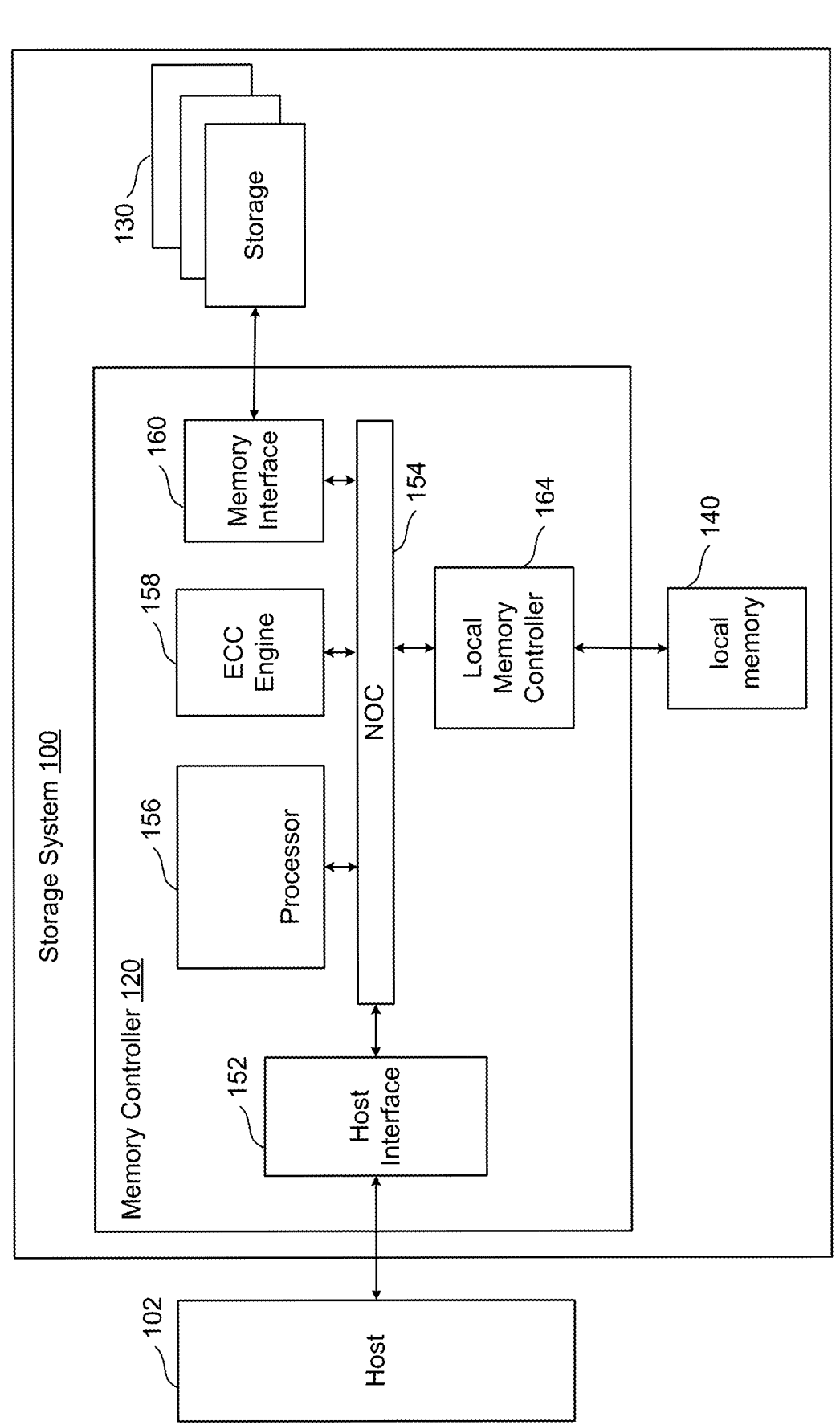
FIG. 1 is a block diagram depicting one embodiment of a storage system.

FIG. 1 is a block diagram of one embodiment of a storage system 100 that implements the technology described herein. In one embodiment, storage system 100 is a solid state drive ("SSD"). Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 (or storage controller) connected to non-volatile storage 130 and local high speed memory 140 (e.g., DRAM, SRAM, MRAM). Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
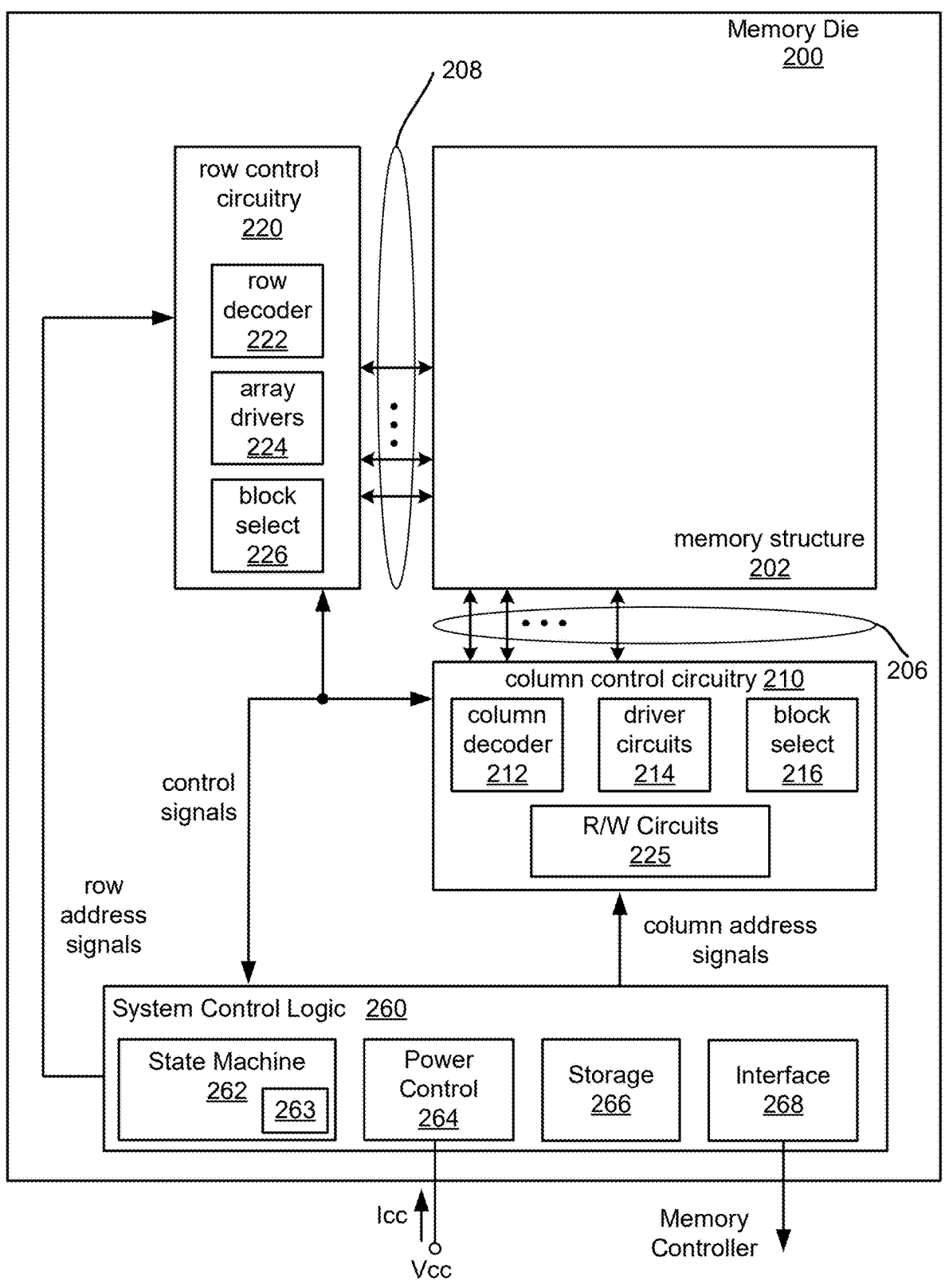
FIG. 2A is a block diagram of one embodiment of a memory die.

In one embodiment, non-volatile storage 130 comprises one or more memory dies. FIG. 2A is a functional block diagram of one embodiment of a memory die 200 that comprises non-volatile storage 130. Each of the one or more memory dies of non-volatile storage 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below. The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and I/O multiplexers. The system control logic 260, column control circuitry 210, and/or row control circuitry 220 are configured to control memory operations such as open block reads at the die level.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. The power control module 264 may be connected to a terminal to receive a power supply voltage (e.g., Vcc). Vcc is one example name for a power supply voltage, but a different name could be used. The memory die 200 may draw a current (e.g., Icc) as result of performing memory operations. In an embodiment, the power control module 264 generates an internal supply voltage referred to as Vdd. System control logic 260 includes storage 266 (e.g., RAM, registers, latches, etc.), which may be used to store parameters for operating the memory structure 202.

In an embodiment, the state machine 262 communicates with power control 264 to control voltages applied to the memory structure during read operations. The power control 264 may generate the voltages. Those voltages may include one or more read reference voltages (e.g., Vcgr) applied to a selected word line, a read pass voltage (e.g., Vread) applied to unselected word lines, and select voltages applied to select lines. The state machine 262 may communicate with the power control 264 to control the magnitude and/or timing of such voltages. In an embodiment, the state machine 262 has multi-step Vread discharge logic 263, which controls the discharge of Vread at the conclusion of a read operation. The multi-step Vread discharge may reduce peak Icc during a final portion of the read operation.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used. The commands may include one or more commands to execute an open block read in accordance with one or more embodiments described herein.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2B:
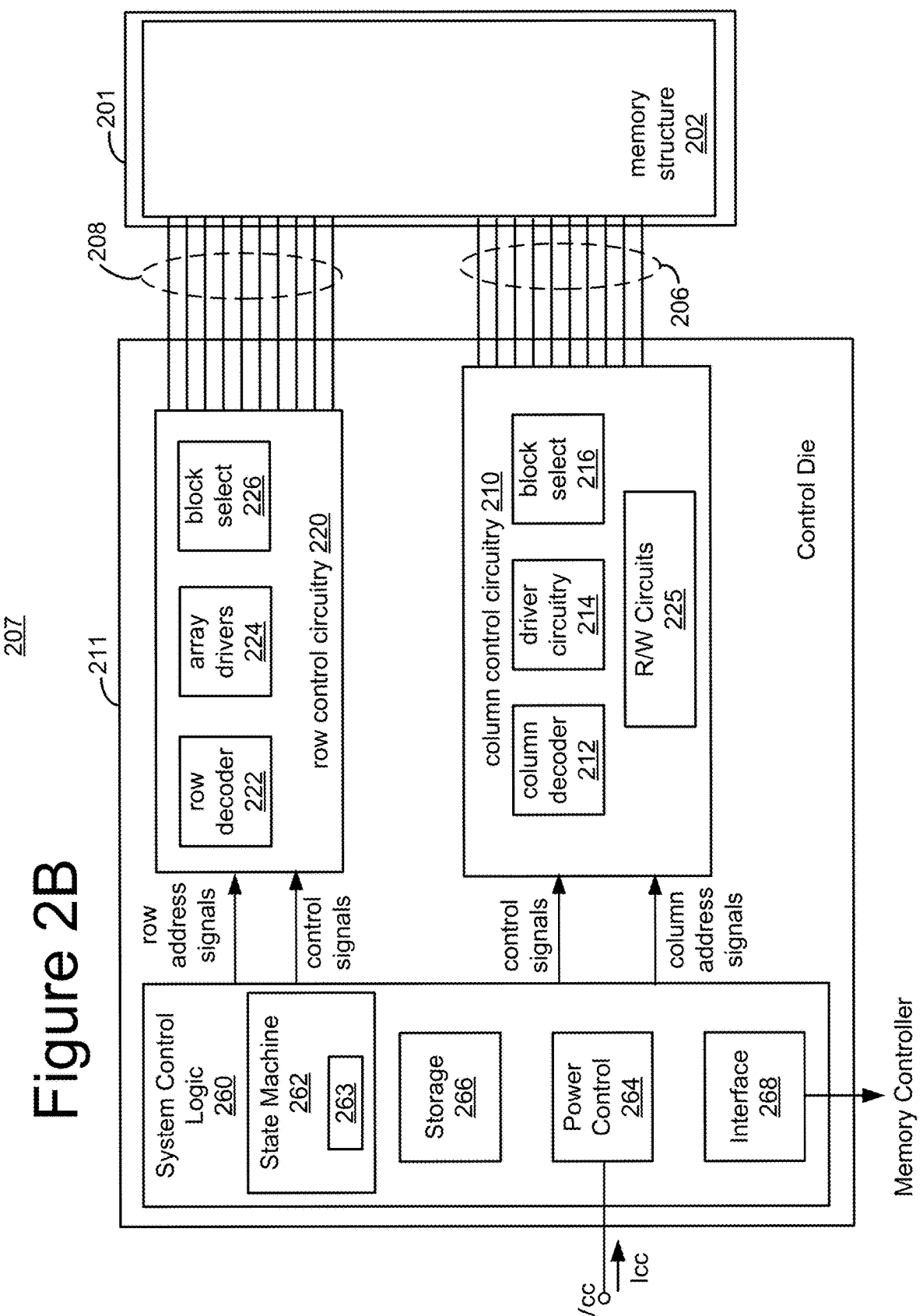
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, storage 130, memory die 200, integrated memory assembly 207, and/or control die 211.

Figures 3A, 3B:
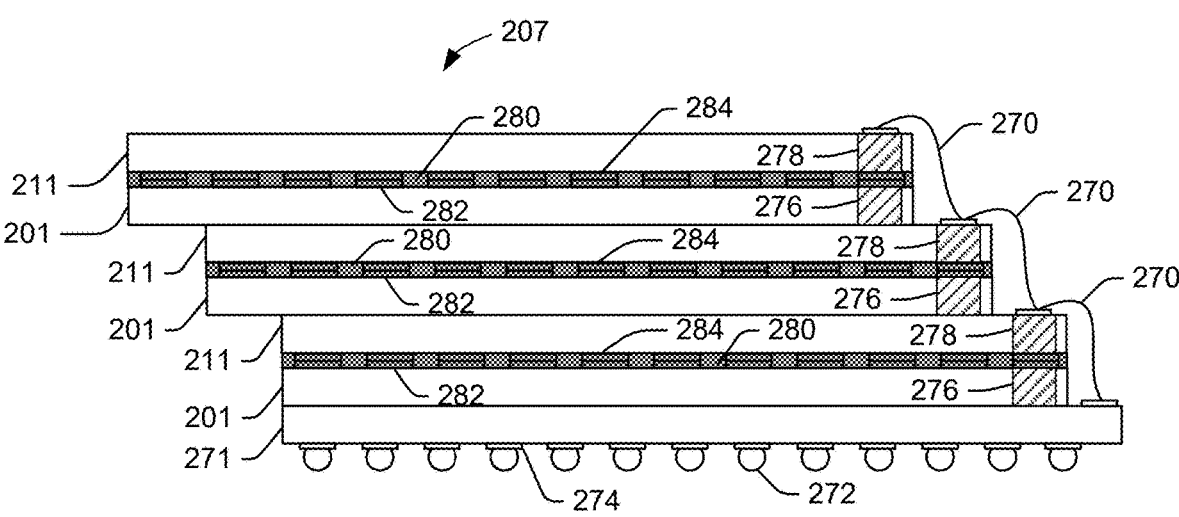
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

Figure 3C:
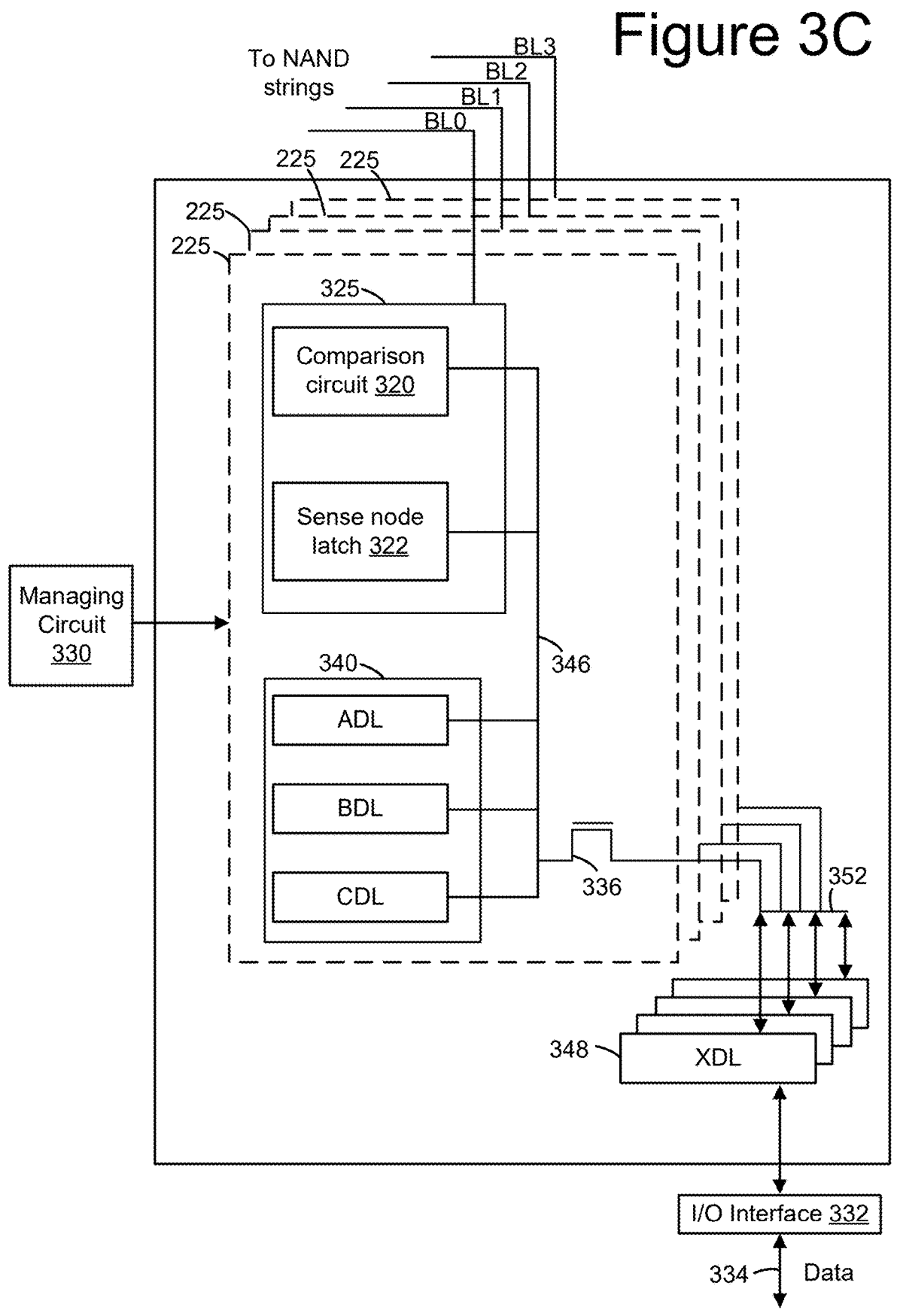
FIG. 3C is a block diagram depicting one embodiment of a portion of column control circuitry that contains a number of read/write circuits.

FIG. 3C is a block diagram depicting one embodiment of a portion of column control circuitry 210 that contains a number of read/write circuits 225. Each read/write circuit 225 is partitioned into a sense amplifier 325 and data latches 340. A managing circuit 330 controls the read/write circuits 225. The managing circuit 330 may communicate with state machine 262. In one embodiment, each sense amplifier 325 is connected to a respective bit line. Each bit line may be connected, at one point in time, to one of a large number of different NAND strings. A select gate on the NAND string may be used to connect the NAND string channel to the bit line.

Each sense amplifier 325 operates to provide voltages to one of the bit lines (see BL0, BL1, BL2, BL3) during program, verify, erase, and read operations. Sense amplifiers are also used to sense the condition (e.g., data state) of a memory cell in a NAND string connected to the bit line that connects to the respective sense amplifier.

Each sense amplifier 325 may have a sense node. During sensing, a sense node is charged up to an initial voltage, Vsense_init, such as 3V. The sense node is then connected to the bit line for a sensing time, and an amount of decay of the sense node is used to determine whether a memory cell is in a conductive or non-conductive state. The amount of decay of the sense node also indicates whether a current Icell in the memory cell exceeds a reference current, Iref. A larger decay corresponds to a larger current. If Icell<=Iref, the memory cell is in a non-conductive state and if Icell>Iref, the memory cell is in a conductive state. In an embodiment, the sense node has a capacitor that is pre-charged and then discharged for the sensing time.

In particular, the comparison circuit 320 determines the amount of decay by comparing the sense node voltage to a trip voltage after the sensing time. If the sense node voltage decays below the trip voltage, Vtrip, the memory cell is in a conductive state and its Vth is at or below the verify voltage. If the sense node voltage does not decay below Vtrip, the memory cell is in a non-conductive state and its Vth is above the verify voltage. A sense node latch 322 is set to 0 or 1, for example, by the comparison circuit 320 based on whether the memory cell is in a conductive or non-conductive state, respectively. The bit in the sense node latch 322 can also be used in a lockout scan to decide whether to set a bit line voltage to an inhibit or a program enable level in a next program loop. The bit in the sense node latch 322 can also be used in a lockout mode to decide whether to set a bit line voltage to a sense voltage or a lockout voltage in a read operation.

The data latches 340 are coupled to the sense amplifier 325 by a local data bus 346. The data latches 340 include three latches (ADL, BDL, CDL) for each sense amplifier 325 in this example. More or fewer than three latches may be included in the data latches 340. In one embodiment, for programming each data latch 340 is used to store one bit to be stored into a memory cell and for reading each data latch 340 is used to store one bit read from a memory cell. In a three bit per memory cell embodiment, ADL stores a bit for a lower page of data, BDL stores a bit for a middle page of data, CDL stores a bit for an upper page of data. Each read/write circuit 225 is connected to an XDL latch 348 by way of an XDL bus 352. In this example, transistor 336 connects local data bus 346 to XDL bus 352. An I/O interface 332 is connected to the XDL latches 348. The XDL latch 348 associated with a particular read/write circuit 225 serves as an interface latch for storing/latching data from the memory controller.

Managing circuit 330 performs computations, such as to determine the data stored in the sensed memory cell and store the determined data in the set of data latches. Each set of data latches 340 is used to store data bits determined by managing circuit 330 during a read operation, and to store data bits imported from the data bus 334 during a program operation which represent write data meant to be programmed into the memory. I/O interface 332 provides an interface between XDL latches 348 and the data bus 334.

During reading, the operation of the system is under the control of state machine 262 that controls the supply of different control gate voltages to the addressed memory cell. As it steps through the various predefined control gate voltages corresponding to the various memory states supported by the memory, the sense circuit may trip at one of these voltages and a corresponding output will be provided from the sense amplifier to managing circuit 330. At that point, managing circuit 330 determines the resultant memory state by consideration of the tripping event(s) of the sense circuit and the information about the applied control gate voltage from the state machine. It then computes a binary encoding for the memory state and stores the resultant data bits into data latches 340.

During program or verify operations for memory cells, the data to be programmed (write data) is stored in the set of data latches 340 from the data bus 334 by way of XDL latches 348. The program operation, under the control of the state machine 262, applies a series of programming voltage pulses to the control gates of the addressed memory cells. Each voltage pulse may be stepped up in magnitude from a previous program pulse by a step size in a process referred to as incremental step pulse programming. In one embodiment, each program voltage is followed by a verify operation to determine if the memory cells have been programmed to the desired memory state. In some cases, managing circuit 330 monitors the read back memory state relative to the desired memory state. When the two agree, managing circuit 330 sets the bit line in a program inhibit mode such as by updating its latches. This inhibits the memory cell coupled to the bit line from further programming even if additional program pulses are applied to its control gate.

Figure 4:
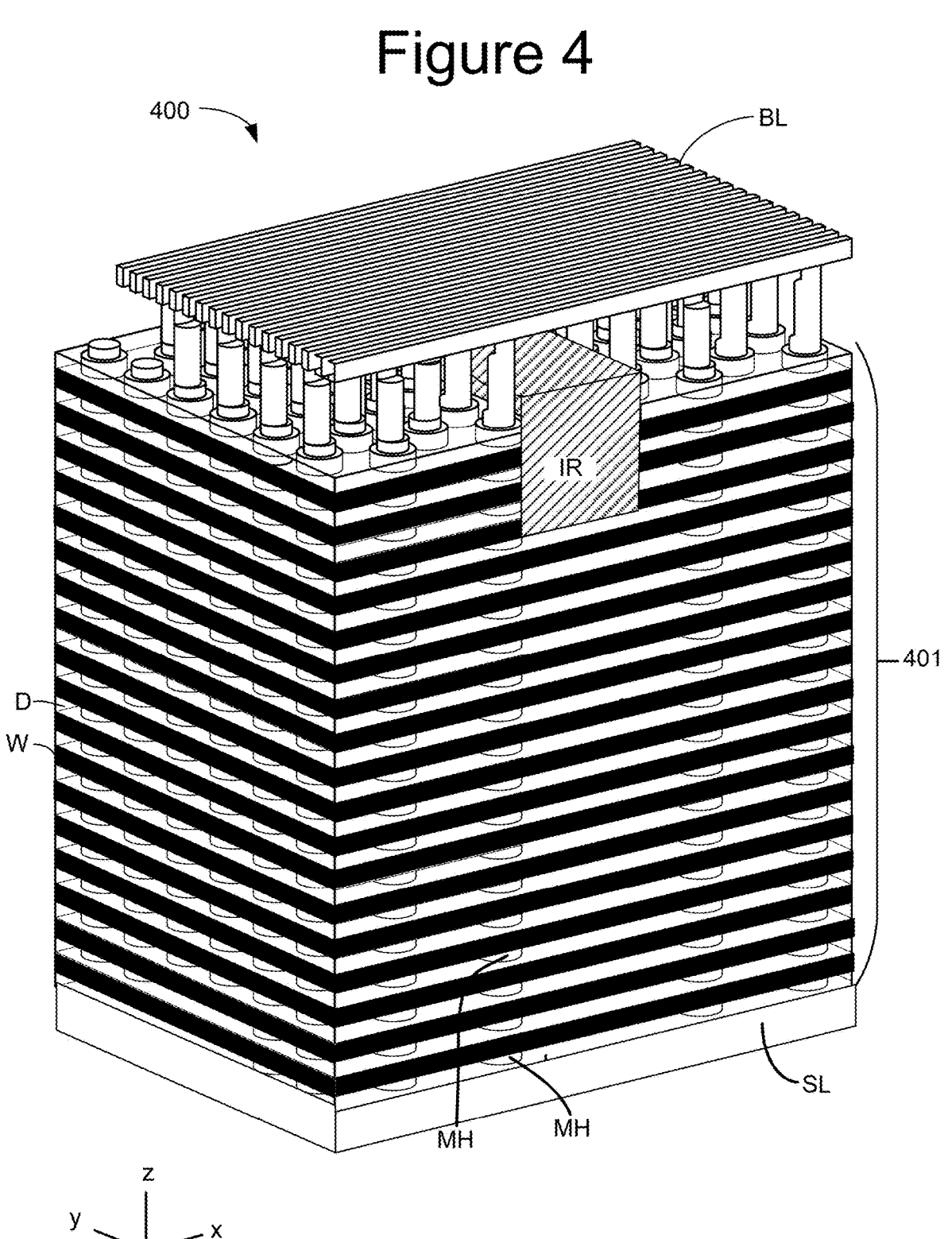
FIG. 4 is a perspective view of a portion of one example embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into four (or a different number of) regions (e.g., sub-blocks) by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
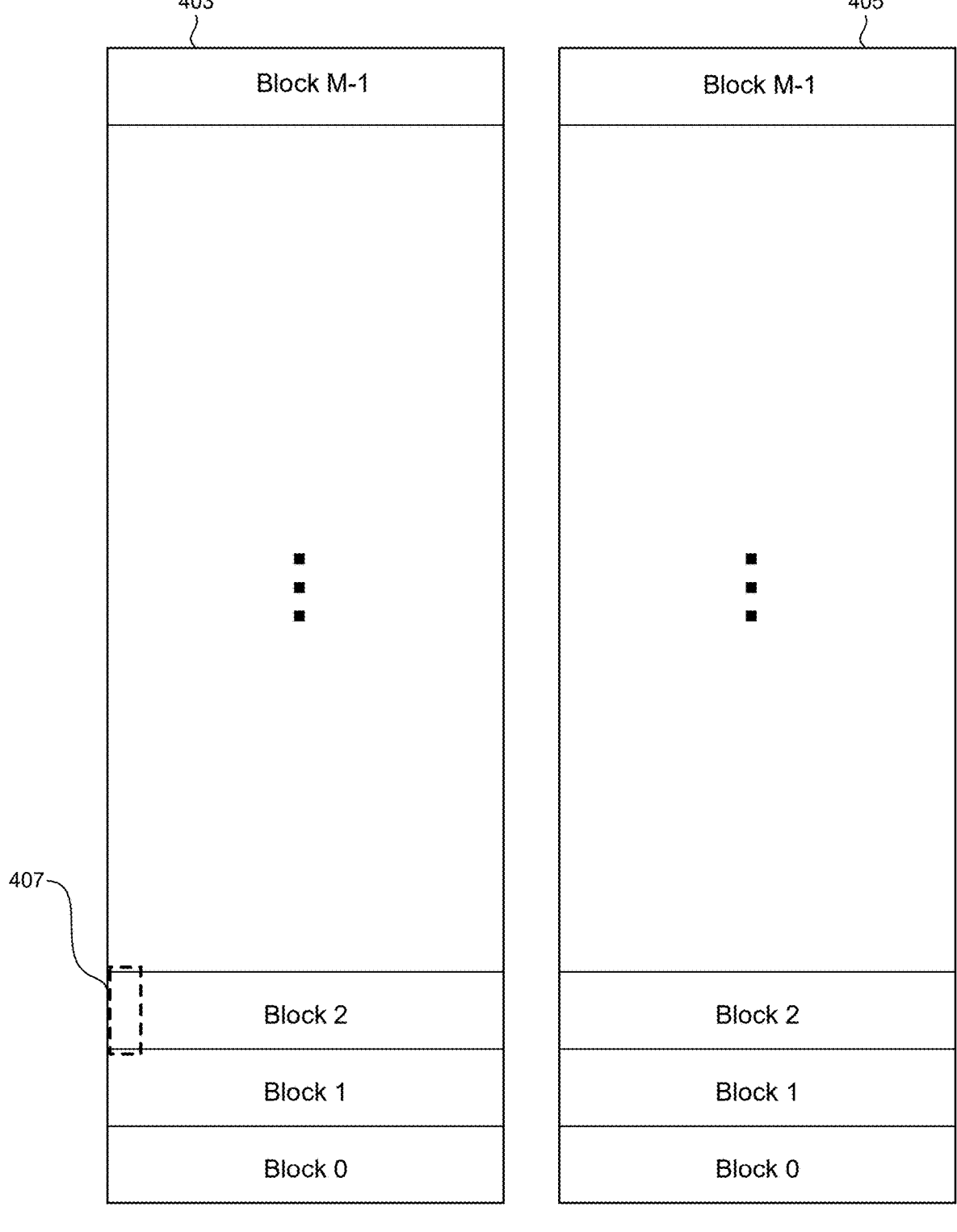
FIG. 4A is a block diagram of one embodiment of a memory structure having two planes.

FIG. 4A is a block diagram explaining one example organization of memory structure 202, which is divided into two planes 403 and 405. Each plane is then divided into M physical blocks. In one example, each plane has about 2000 physical blocks (or more briefly "blocks"). However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 403/405, more or fewer than two planes can be implemented. In some embodiments, memory structure 202 includes four planes. In some embodiments, memory structure 202 includes eight planes. In some embodiments, programming can be performed in parallel in a first selected block in plane 403 and a second selected block in plane 405.

Figure 4B:
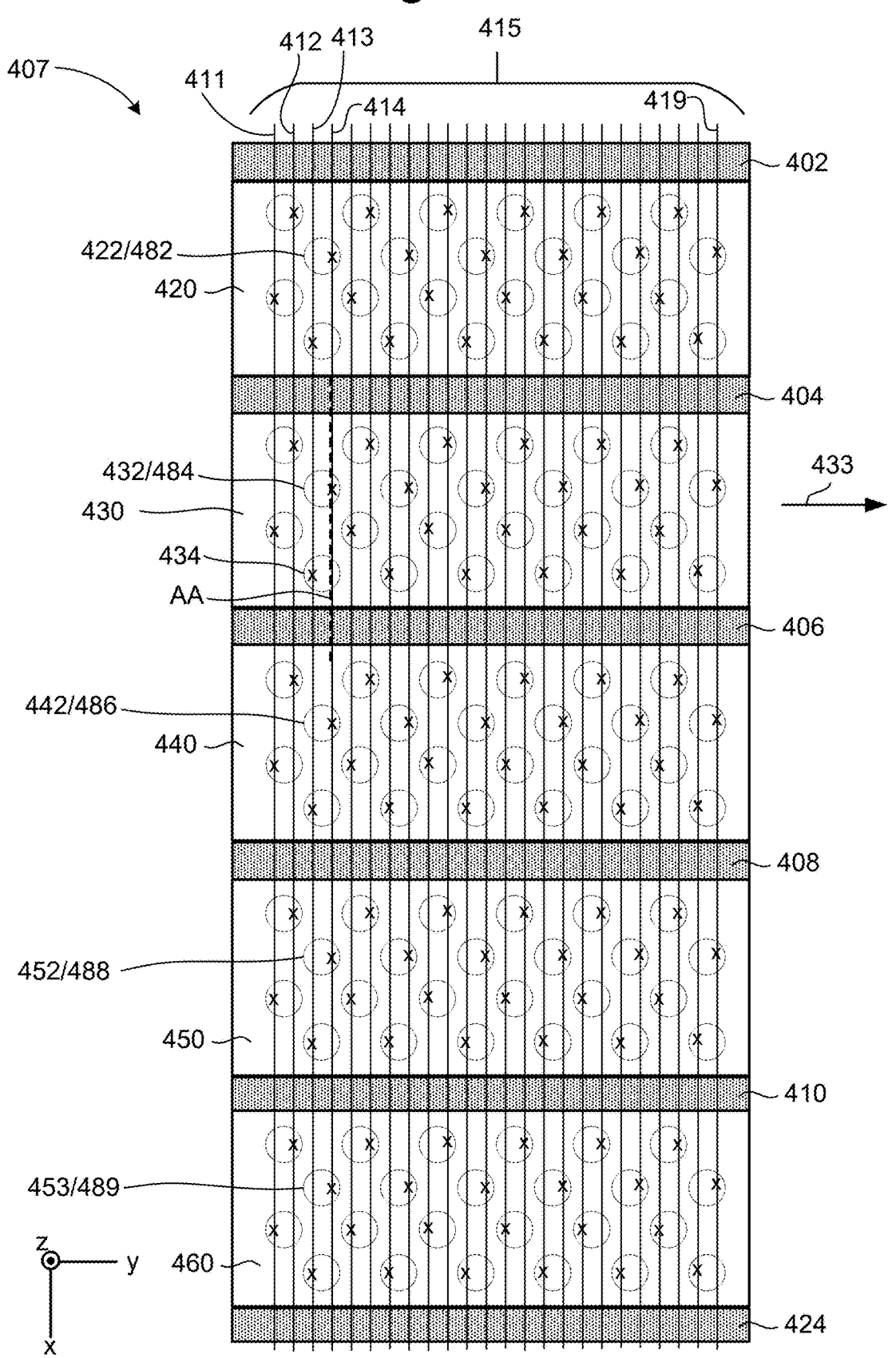
FIG. 4B is a block diagram depicting a top view of a portion of block of memory cells.

FIGS. 4B-4E depict an example three dimensional ("3D") NAND structure that corresponds to the structure of FIG. 4 and can be used to implement memory structure 202 of FIGS. 2A and 2B. FIG. 4B is a diagram depicting a top view of a portion 407 of Block 2. As can be seen from FIG. 4B, the physical block depicted in FIG. 4B extends in the direction of arrow 433. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442, 452 and 453. Vertical column 422 implements NAND string 482. Vertical column 432 implements NAND string 484. Vertical column 442 implements NAND string 486. Vertical column 452 implements NAND string 488. Vertical column 453 implements NAND string 486. Vertical column 452 implements NAND string 489. More details of the vertical columns are provided below. Since the physical block depicted in FIG. 4B extends in the direction of arrow 433, the physical block includes more vertical columns than depicted in FIG. 4B.

FIG. 4B also depicts a set of bit lines 415, including bit lines 411, 412, 413, 414, . . . 419. FIG. 4B shows twenty-four bit lines because only a portion of the block is depicted. It is contemplated that more than twenty-four bit lines connected to vertical columns of the physical block. Each of the circles representing vertical columns has an "x" to indicate its connection to one bit line. For example, bit line 414 is connected to vertical columns 422, 432, 442 and 452.

The block depicted in FIG. 4B includes a set of isolation regions 402, 404, 406, 408, 410, and 424, which are formed of SiO$_2$; however, other dielectric materials can also be used. Isolation regions 402, 404, 406, 408, 410, and 424 serve to divide the top layers of the physical block into five regions; for example, the top layer depicted in FIG. 4B is divided into regions 420, 430, 440, 450, and 460 of which are referred to as sub-blocks. In one embodiment, isolation regions 402 and 424 separate the physical block from adjacent physical blocks. Thus, isolation regions 402 and 424 may extend down to the substrate. In one embodiment, the isolation regions 404, 406, and 410 only divide the layers used to implement select gates so that NAND strings in different sub-blocks can be independently selected. Referring back to FIG. 4, the IR region may correspond to any of isolation regions 404, 406, 408, or 410. In one example implementation, a bit line only connects to one vertical column/NAND string in each of regions (sub-blocks) 420, 430, 440, 450, and 460. In that implementation, each physical block has twenty rows of active columns and each bit line connects to five rows in each block. In one embodiment, all of the five vertical columns/NAND strings connected to a common bit line are connected to the same word line (or set of word lines); therefore, the system uses the drain side selection lines to choose one (or another subset) of the five to be subjected to a memory operation (program, verify, read, and/or erase).

Although FIG. 4B shows each region (420, 430, 440, 450, 460) having four rows of vertical columns, five regions (420, 430, 440, 450, 460) and twenty rows of vertical columns in a block, those exact numbers are an example implementation. Other embodiments may include more or fewer regions (420, 430, 440, 450, 460) per block, more or fewer rows of vertical columns per region and more or fewer rows of vertical columns per block. FIG. 4B also shows the vertical columns being staggered. In other embodiments, different patterns of staggering can be used. In some embodiments, the vertical columns are not staggered.

Figure 4C:
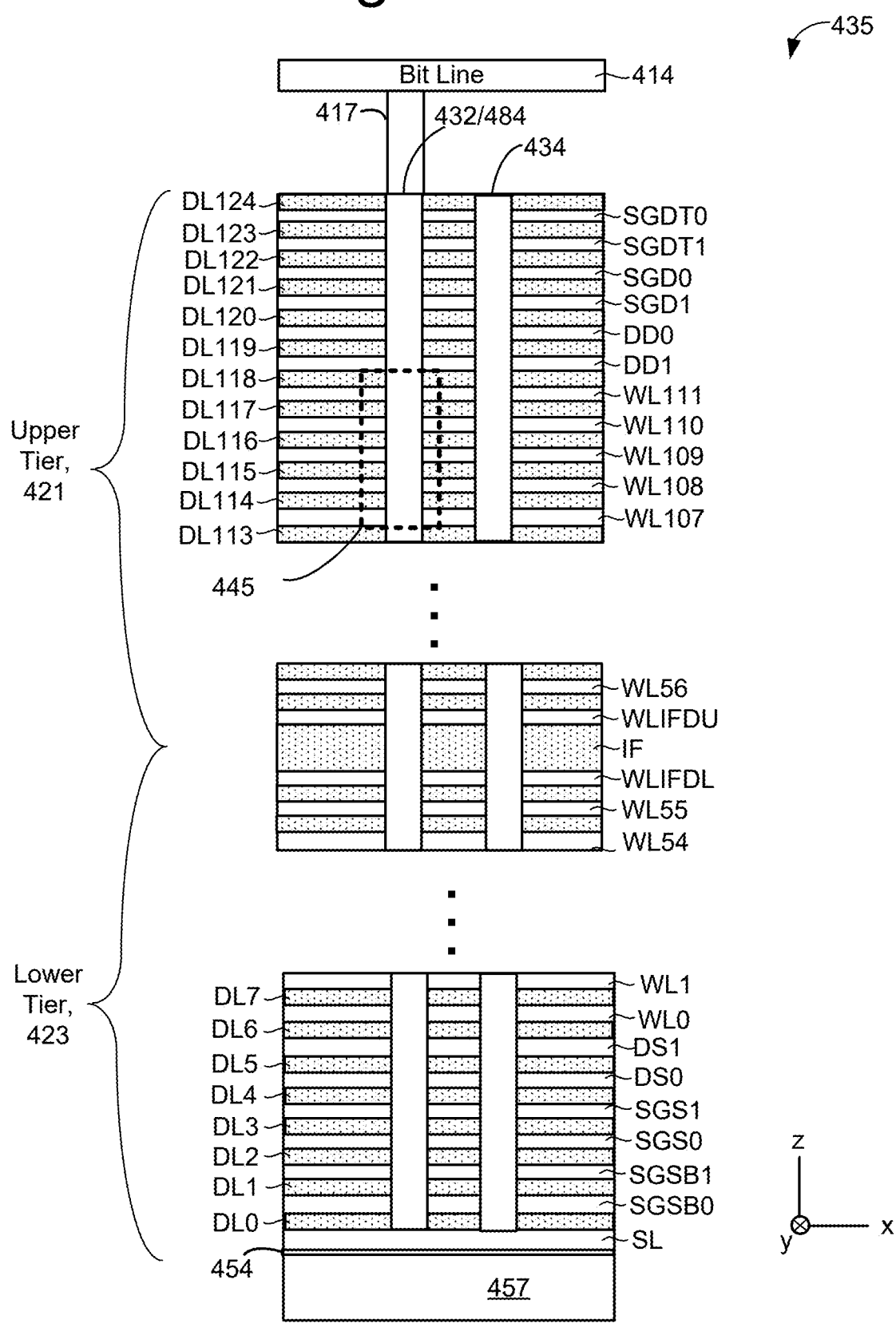
FIG. 4C depicts an embodiment of a stack showing a cross-sectional view along line AA of FIG. 4B.

FIG. 4C depicts an example of a stack 435 showing a cross-sectional view along line AA of FIG. 4B. The SGD layers include SGDT0, SGDT1, SGD0, and SGD1. The SGD layers may have more or fewer than four layers. The SGS layers includes SGSB0, SGSB1, SGS0, and SGS1. The SGS layers may have more or fewer than four layers. Six dummy word line layers DD0, DD1, WLIFDU, WLIDDL, DS1, and DS0 are provided, in addition to the data word line layers WL0-WL111. There may be more or fewer than 112 data word line layers and more or fewer than four dummy word line layers. Each NAND string has a drain side select gate at the SGD layers. Each NAND string has a source side select gate at the SGS layers. Also depicted are dielectric layers DL0-DL124.

Columns 432, 434 of memory cells are depicted in the multi-layer stack. The stack includes a substrate 457, an insulating film 454 on the substrate, and a portion of a source line SL. A portion of the bit line 414 is also depicted. Note that NAND string 484 is connected to the bit line 414. NAND string 484 has a source-end at a bottom of the stack and a drain-end at a top of the stack. The source-end is connected to the source line SL. A conductive via 417 connects the drain-end of NAND string 484 to the bit line 414.

In one embodiment, the memory cells are arranged in NAND strings. The word line layers WL0-WL111 connect to memory cells (also called data memory cells). Dummy word line layers DD0, DD1, DS0 and DS1 connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD are used to electrically connect and disconnect (or cut off) the channels of respective NAND strings from bit lines. Source side select layers SGS are used to electrically connect and disconnect (or cut off) the channels of respective NAND strings from the source line SL.

FIG. 4C depicts an example of a stack 435 having two tiers. The two-tier stack comprises an upper tier 421 and a lower tier 423. A two-tier other multi-tier stack can be used to form a relatively tall stack while maintaining a relatively narrow memory hole width (or diameter). After the layers of the lower tier are formed, memory hole portions are formed in the lower tier. Subsequently, after the layers of the upper tier are formed, memory hole portions are formed in the upper tier, aligned with the memory hole portions in the lower tier to form continuous memory holes from the bottom to the top of the stack. The resulting memory hole is narrower than would be the case if the hole were etched from the top to the bottom of the stack rather than in each tier individually. An interface (IF) region is created where the two tiers are connected. The IF region is typically thicker than the other dielectric layers. Due to the presence of the IF region, the adjacent word line layers suffer from edge effects such as difficulty in programming or erasing. These adjacent word line layers can therefore be set as dummy word lines (WLIFDL, WLIFDU). In some embodiments, the upper tier 421 and the lower tier 423 are erased independent of one another. Hence, data may be maintained in the lower tier 423 after the upper tier 421 is erased. Likewise, data may be maintained in the upper tier 421 after the lower tier 423 is erased.

Figure 4D:
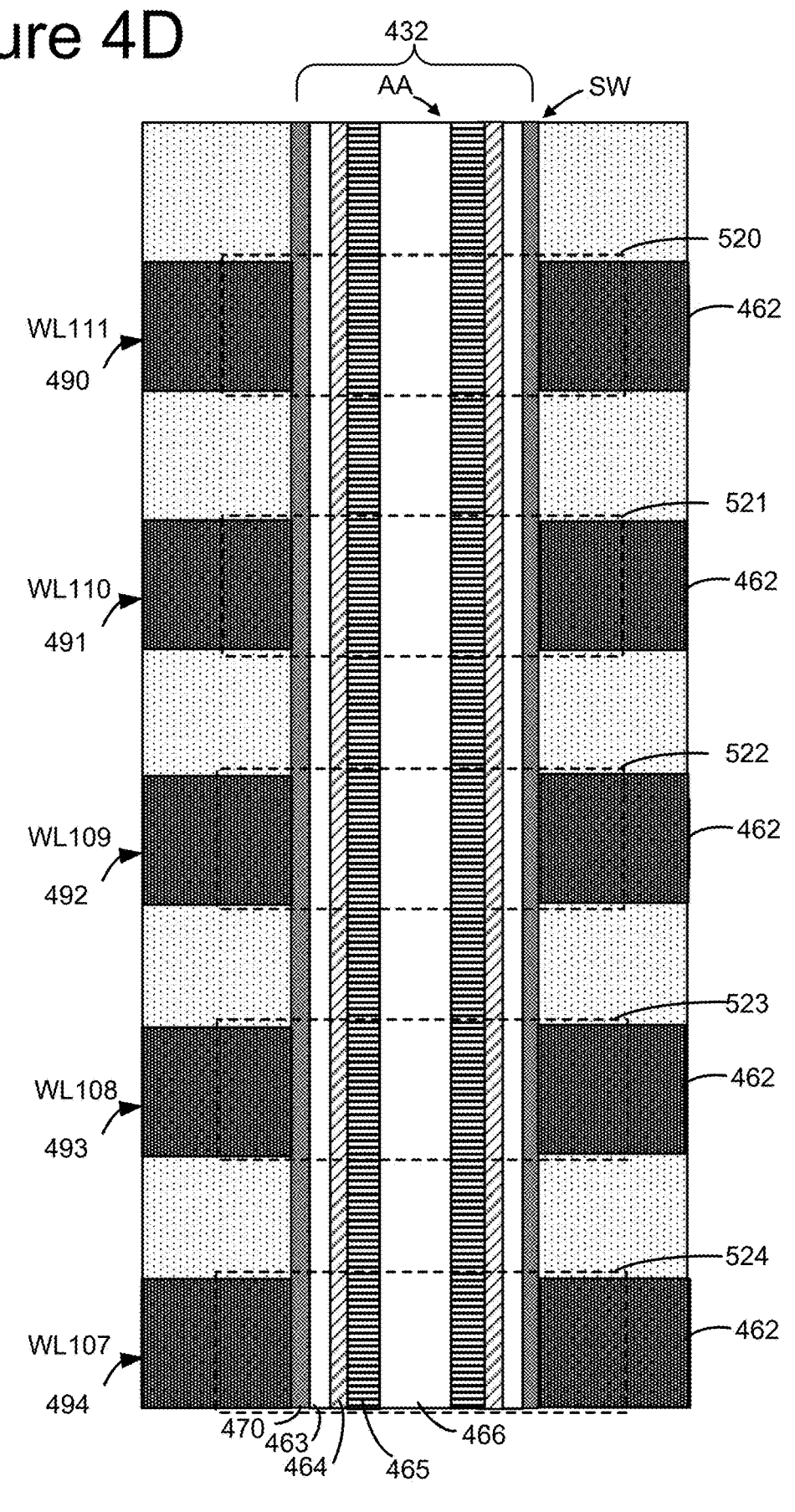
FIG. 4D depicts a view of the region 445 of FIG. 4C.

FIG. 4D depicts a view of the region 445 of FIG. 4C. Data memory cell transistors 520, 521, 522, 523, and 524 are indicated by the dashed lines. A number of layers can be deposited along the sidewall (SW) of the memory hole 432 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4E:
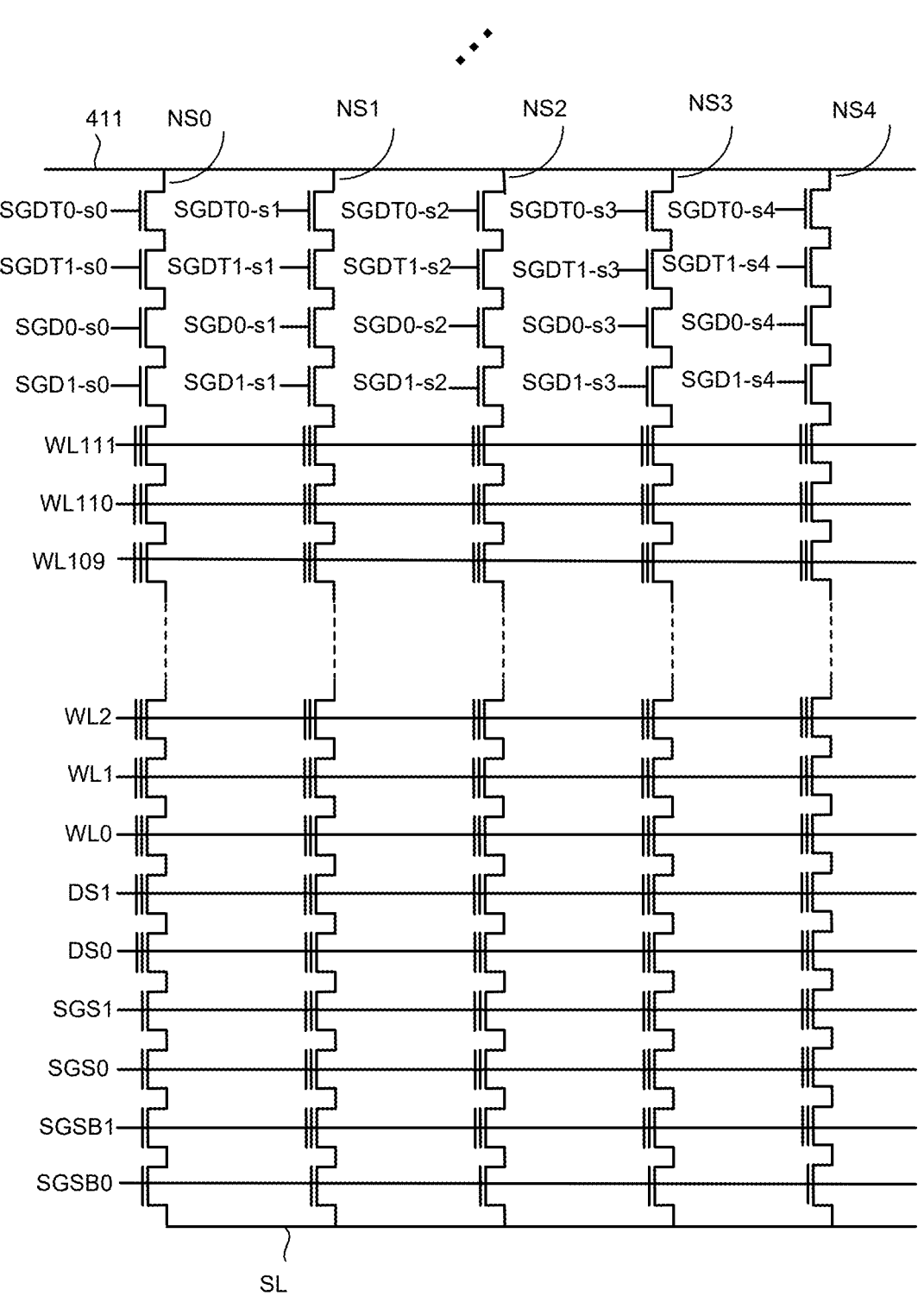
FIG. 4E is a schematic diagram of a portion of one embodiment of a block, depicting several NAND strings.

FIG. 4E is a schematic diagram of a portion of the memory array 202. FIG. 4E shows physical data word lines WL0-WL111 running across the entire block. The structure of FIG. 4E corresponds to a portion 407 in Block 2 of FIG. 4A, including bit line 411. Within the physical block, in one embodiment, each bit line is connected to five NAND strings. Thus, FIG. 4E shows bit line 411 connected to NAND string NS0, NAND string NS1, NAND string NS2, NAND string NS3, and NAND string NS4.

In one embodiment, there are five sets of drain side select lines in the block. For example, the set of drain side select lines connected to NS0 include SGDT0-*s*0, SGDT1-*s*0, SGD0-*s*0, and SGD1-*s*0. The set of drain side select lines connected to NS1 include SGDT0-*s*1, SGDT1-*s*1, SGD0-*s*1, and SGD1-*s*1. The set of drain side select lines connected to NS2 include SGDT0-*s*2, SGDT1-*s*2, SGD0-*s*2, and SGD1-*s*2. The set of drain side select lines connected to NS3 include SGDT0-*s*3, SGDT1-*s*3, SGD0-*s*3, and SGD1-*s*3. The set of drain side select lines connected to NS4 include SGDT0-*s*4, SGDT1-*s*4, SGD0-*s*4, and SGD1-*s*4. Herein the term "SGD" may be used as a general term to refer to any one or more of the lines in a set of drain side select lines. Each set drain side select lines connects to a group of NAND strings in the block. Only one NAND string of each group is depicted in FIG. 4E. These five sets of drain side select lines correspond to five sub-blocks. A first sub-block corresponds to those vertical NAND strings controlled by SGDT0-*s*0, SGDT1-*s*0, SGD0-*s*0, and SGD1-*s*0. A second sub-block corresponds to those vertical NAND strings controlled by SGDT0-*s*1, SGDT1-*s*1, SGD0-*s*1, and SGD1-*s*1. A third sub-block corresponds to those vertical NAND strings controlled by SGDT0-*s*2, SGDT1-*s*2, SGD0-*s*2, and SGD1-*s*2. A fourth sub-block corresponds to those vertical NAND strings controlled by SGDT0-*s*3, SGDT1-*s*3, SGD0-*s*3, and SGD1-*s*3. A fifth sub-block corresponds to those vertical NAND strings controlled by SGDT0-*s*4, SGDT1-*s*4, SGD0-*s*4, and SGD1-*s*4. As noted, FIG. 4E only shows the NAND strings connected to bit line 411. However, a full schematic of the block would show every bit line and five vertical NAND strings connected to each bit line.

In one embodiment, all of the memory cells on the NAND strings in a block are erased as a unit. However in some embodiments, a block is operated as an upper tier and a lower tier, wherein the upper tier and the lower tier each form an erase unit. For example, memory cells connected to WL0-WL55 may be in the lower tier 423 and memory cells connected to WL56-WL111 may be in the upper tier 421. Hence, memory cells connected to WL0-WL55 may be in one erase unit and memory cells connected to WL56-WL111 may be in another erase unit. A block could be operated in more than two tiers. Erase units can be formed based on other divisions of blocks.

Although the example memories of FIGS. 4-4E are three dimensional memory structure that includes vertical NAND strings with charge-trapping material, other 3D memory structures can also be used with the technology described herein.

Figures 5A, 5B:
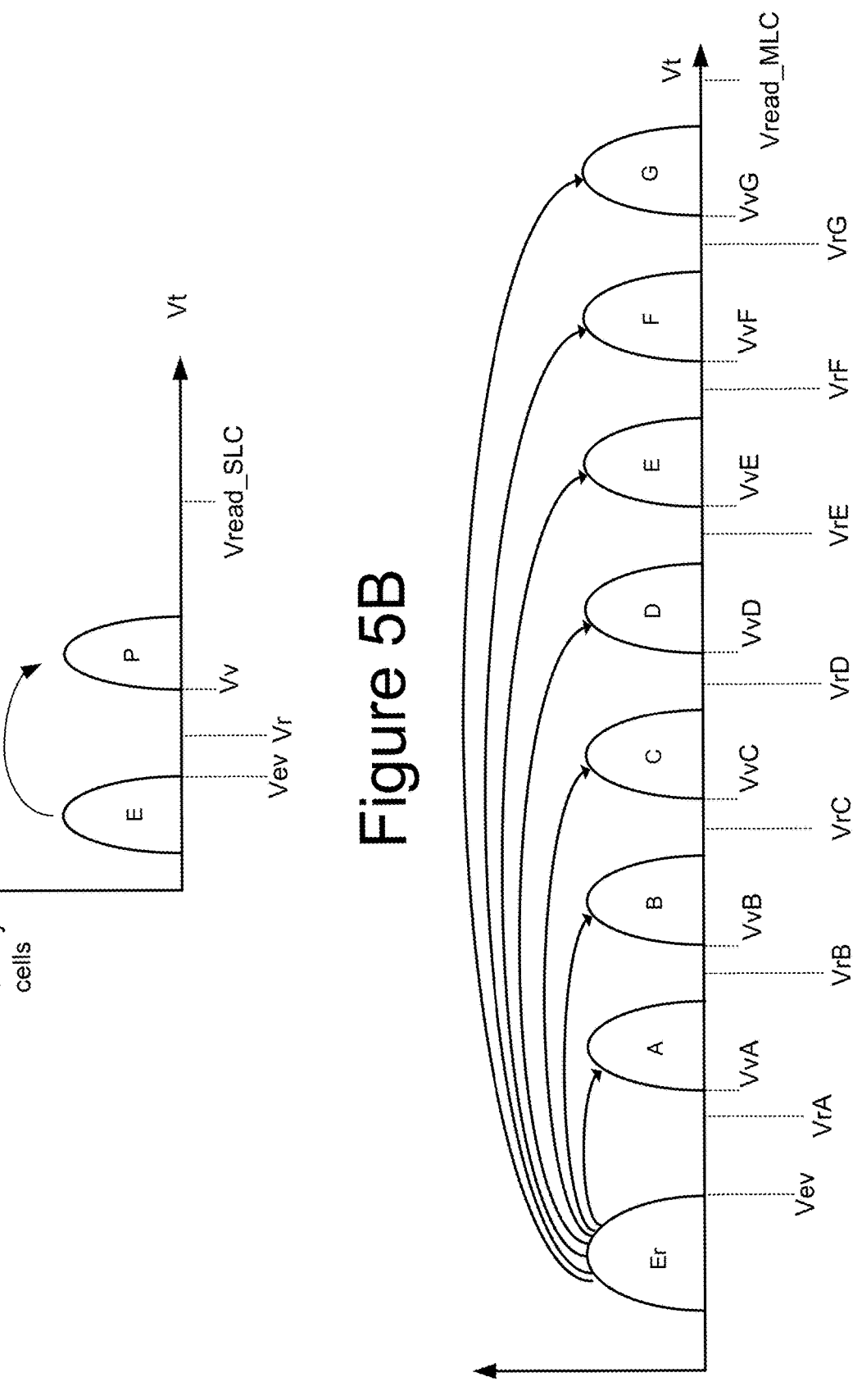
FIGS. 5A and 5B depicts threshold voltage distributions.

The storage systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine a memory cells is erased (state E) or programmed (state P). FIG. 5A also depicts verify reference voltage Vv. In some embodiments, when programming memory cells to data state P, the system will test whether those memory cells have a threshold voltage greater than or equal to Vv. The voltage Vread_SLC is an example magnitude for a read pass voltage that may be applied to unselected word lines when reading SLC cells. Note that Vread_SLC is significantly greater than the P-state Vt distribution.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores three bits of data. Other embodiments may use other data capacities per memory cell (e.g., such as two, four, or five bits of data per memory cell).

FIG. 5B shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. In an embodiment, the number of memory cells in each state is about the same.

FIG. 5B shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 5B also shows a number of verify reference voltages. The verify reference voltages are VvA, VvB, VvC, VvD, VvE, VvF, and VvG. In some embodiments, when programming memory cells to data state A, the system will test whether those memory cells have a threshold voltage greater than or equal to VvA. If the memory cell has a threshold voltage greater than or equal to VvA, then the memory cell is locked out from further programming. Similar reasoning applies to the other data states. The voltage Vread_MLC is an example magnitude for a read pass voltage that may be applied to unselected word lines when reading MLC cells. Note that Vread_MLC is significantly greater than the G-state Vt distribution.

Figure 6:
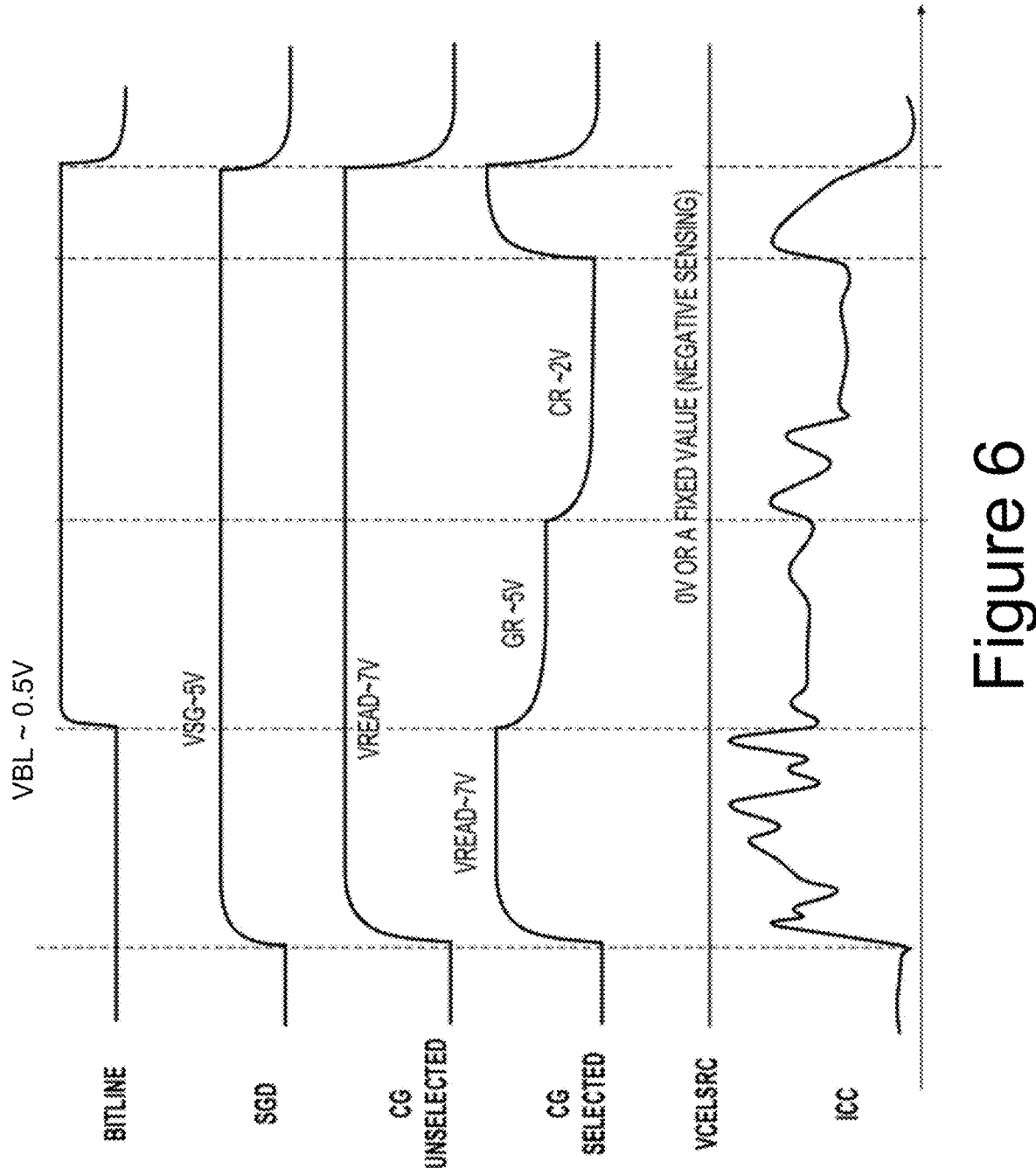
FIG. 6 provides an exemplary embodiment of a waveform of an upper page read operation.

FIG. 6 provides an exemplary embodiment of a waveform of an upper page read operation. FIG. 6 illustrates waveforms of voltages applied during a conventional upper page read. For example, read voltages, GR (e.g., 5V) and CR (e.g., 2V), are applied to selected word lines (CG selected), and GR and CR correspond to an upper page read. As shown in FIG. 6, during the application of the voltages GR and CR to the selected word lines, the select gate line SGD is set to the select gate voltage VSG (e.g., 5V), the unselected word lines (CG unselected) are set to a read pass voltage VREAD (e.g., 7V), the cell source voltage VCELSRC is 0V or a fixed value (e.g., for negative sensing), and the bit lines connected to the memory cells being read are set to a high voltage supply level VBL (e.g., 0.5V).

Further shown in FIG. 6 is the corresponding power supply current (ICC) when preforming the upper page read. As depicted in FIG. 6, the ICC waveform shows significant contribution from sensing data states, GR and CR. Contribution from sensing may get worse for an open block (i.e., the number of word lines in erase state per total word lines). For example, if only one word line is programmed in a block, sensing current gets much higher and average ICC is significantly higher than for a closed block.

Embodiments disclosed herein are directed to systems and methods for improving power efficiency. For example, embodiments described herein allow for read power savings by temporarily cutting off the channel of a memory cell during a word line voltage transition (or word line settling) period. In some embodiments, during the word line voltage transition period, bit line voltage can be temporarily reduced to shut off sensing current.

Figure 7:
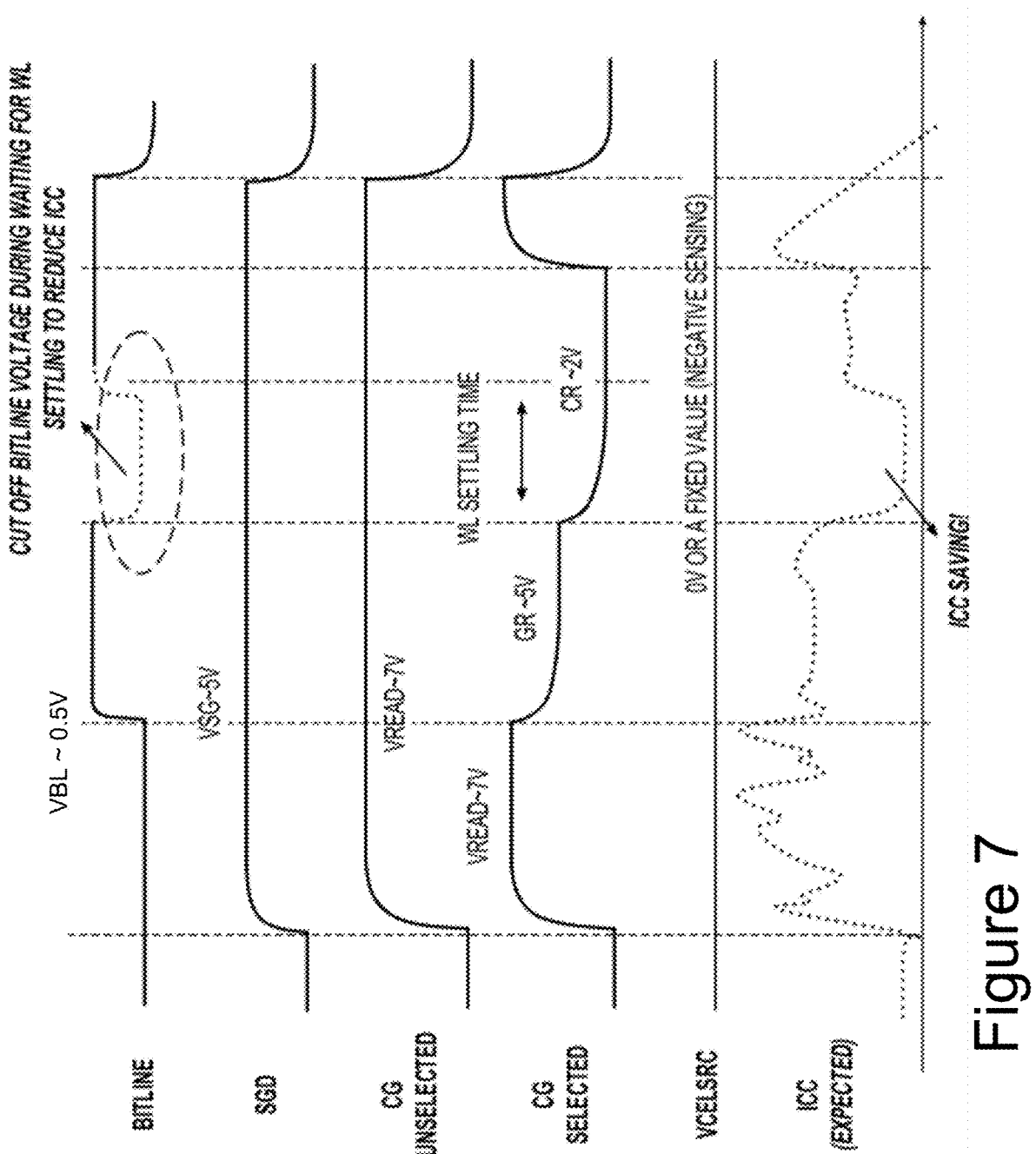
FIG. 7 provides an exemplary embodiment of a waveform of a scheme for temporarily disabling bit line voltage for read ICC savings during a sensing operation.

To explore the above in further detail, FIG. 7 will now be described. FIG. 7 provides an exemplary embodiment of a waveform of a scheme for temporarily disabling bit line voltage for read ICC savings during a sensing operation. In FIG. 7, the scheme is described with reference to an upper page read but may be applied to lower and middle page reads during any word line transition period. Additionally, the scheme may also be applied to reverse order read operations and normal order read operations.

In FIG. 7, similar to the waveform in FIG. 6, read voltages, GR and CR, are applied to selected word lines (CG selected). As shown in FIG. 7, during the application of the voltages GR and CR to the selected word lines, the select gate line SGD is set to the select gate voltage VSG, the unselected word lines (CG unselected) are set to a read pass voltage VREAD, and the cell source voltage VCELSRC is 0V or a fixed value. In contrast with FIG. 6, in FIG. 7, the bit line voltage is cut off to reduce its values while waiting for the selected word line to settle after the GR to CR transition. For example, the transistor supplying the bit line voltage to a corresponding word line can be turned off, allowing the bit line to float or discharge. Word line RC increases with each generation of a memory device due to ON pitch reduction. Scaling of the technology causes word line RC increases because word line-word line capacitance increases with the shrinking of spacing between the word lines and word line resistance increases with the shrinking of the gate length of a memory cell.

In contrast, bit line RC may decrease with each generation of memory device as bit line length is reduced, and bit line RC is a function of bit line length. Consequently, bit line settling time can be negligible, and the bit line can be instantaneously shut off due to shorter bit line length (i.e., smaller bit line RC).

Figure 12:
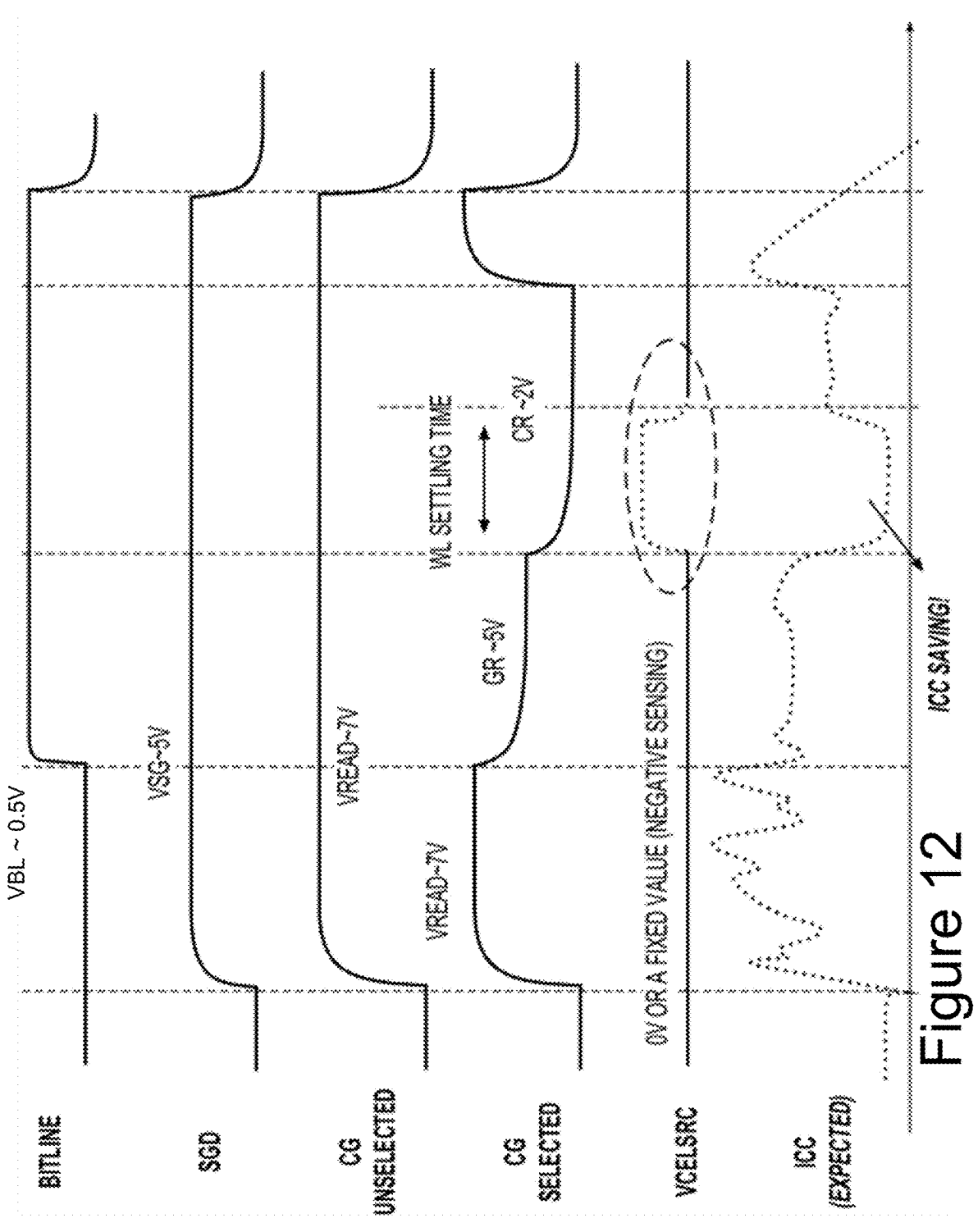
FIG. 12 provides an exemplary embodiment of a waveform of a scheme for temporarily increasing source line voltage for ICC savings during a sensing operation.

As shown in FIG. 7, the corresponding ICC waveform shows significant ICC savings during the word line settling time as compared with the ICC waveform in FIG. 12. During the GR to CR transition, bit line voltage level is reduced to shut off unwanted Icell, which can significantly reduce ICC. Once the word line is stable, the bit line voltage can ramp back up to a nominal value to continue sensing CR. As explained, the bit line settling time is negligible, thereby allowing for no performance penalty.

Figure 8:
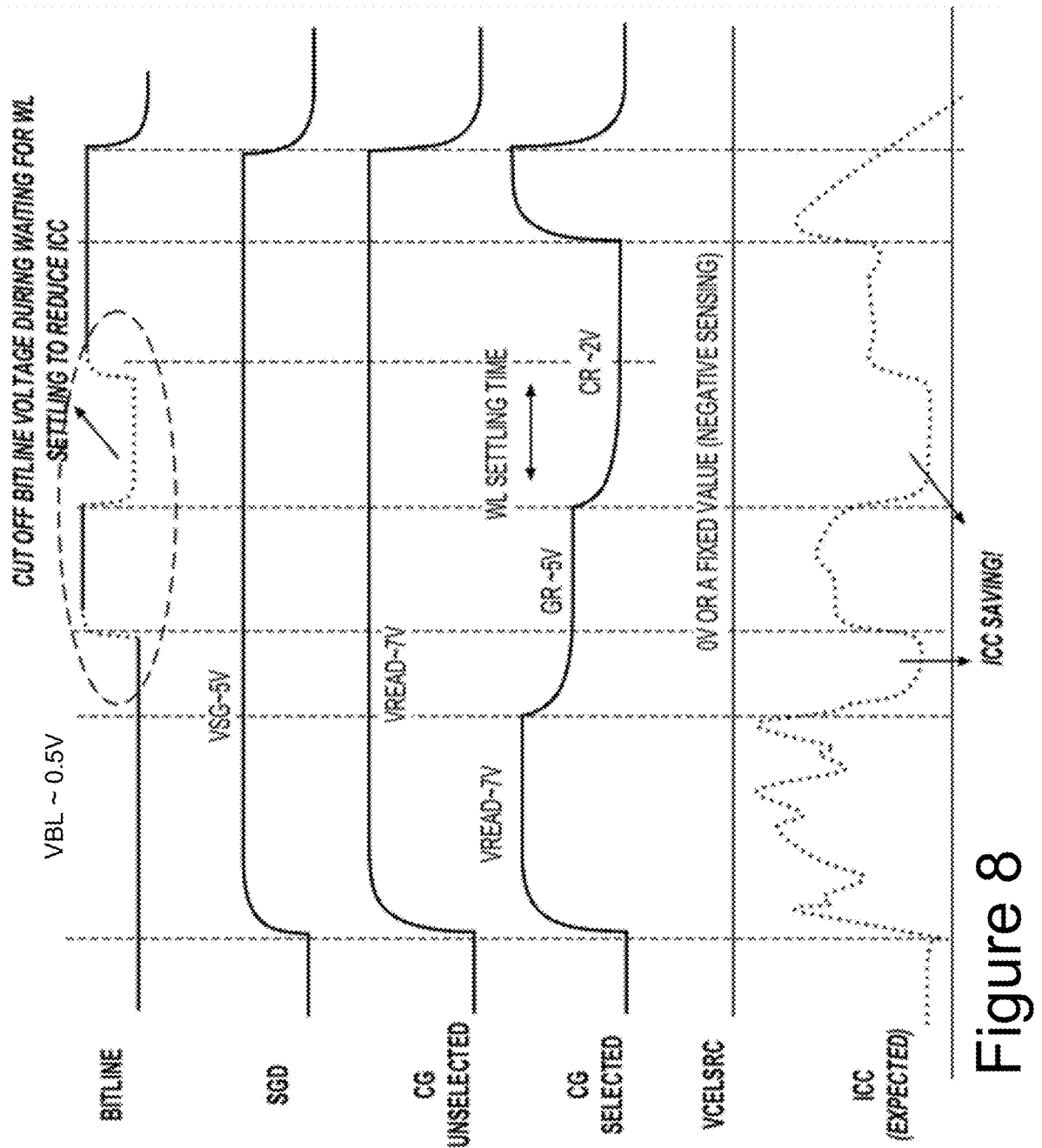
FIG. 8 shows another exemplary implementation of the scheme described with reference to FIG. 7.

For further reduction of ICC, FIG. 8 shows another exemplary implementation of the scheme described with reference to FIG. 7. In FIG. 8, the scheme further includes the bit line voltage level ramping up before a sensing operation after a word line settling period has ended. As seen in FIG. 8, the bit line voltage is ramped up at the end of the word line settling period after the VREAD to GR transition rather than the bit line voltage being ramped up at the beginning of the word line settling period after the VREAD to GR transition, as depicted in FIG. 6. This allows for additional read ICC savings. As shown in FIG. 8, the corresponding ICC waveform shows ICC savings during the word line settling time after the VREAD to GR transition.

To explore the following in further detail, FIG. 9 will now be described. FIG. 9 depicts a method 900 for temporarily disabling bit line voltage for ICC savings during a sensing operation, in accordance with embodiments described herein. In some embodiments, method 900 may be implemented by a controller, control circuitry, a processor, and/or the like, as described elsewhere herein. As shown in FIG. 9, method 900 starts at step 902. In step 902, a word line voltage of a word line, associated with a target memory cell of the set of memory cells, transitions from a first word line voltage level to a second word line voltage level. For example, with reference to FIGS. 2A and 2B, control circuitry 260 may transition a word line voltage of a word line associated with a target memory cell from a first word line voltage level to a second word line voltage level.

In FIG. 9, in step 904, subsequent to transitioning the word line voltage to the second word line voltage level, a bit line voltage of a bit line, associated with the target memory cell, is cut off and ramped down from a first bit line voltage level to a second bit line voltage level, such as a to float or be discharged. For example, with continued reference to FIGS. 2A and 2B, control circuitry 260 may ramp down a bit line voltage of a bit line associated with the target memory cell from a first bit line voltage level to a second bit line voltage level.

In FIG. 9, in step 906, prior to sensing a state of the memory cell, the bit line voltage is ramped up from the second bit line voltage level to the first bit line voltage level. For example, with continued reference to FIGS. 2A and 2B, control circuitry 260 may ramp up the bit line voltage from the second bit line voltage level to the first bit line voltage level. In some embodiments, control circuitry 260 may transition the word line voltage from a third word line voltage level to the first word line voltage level and ramp up the bit line voltage from the second bit line voltage level to the first bit line voltage level after the word line has settled to the first word line voltage level. Still yet, in some embodiments, control circuitry 260 may ramp up the bit line voltage from the second bit line voltage level to the first bit line voltage level after the word line has settled to the second word line voltage level.

Figure 10:
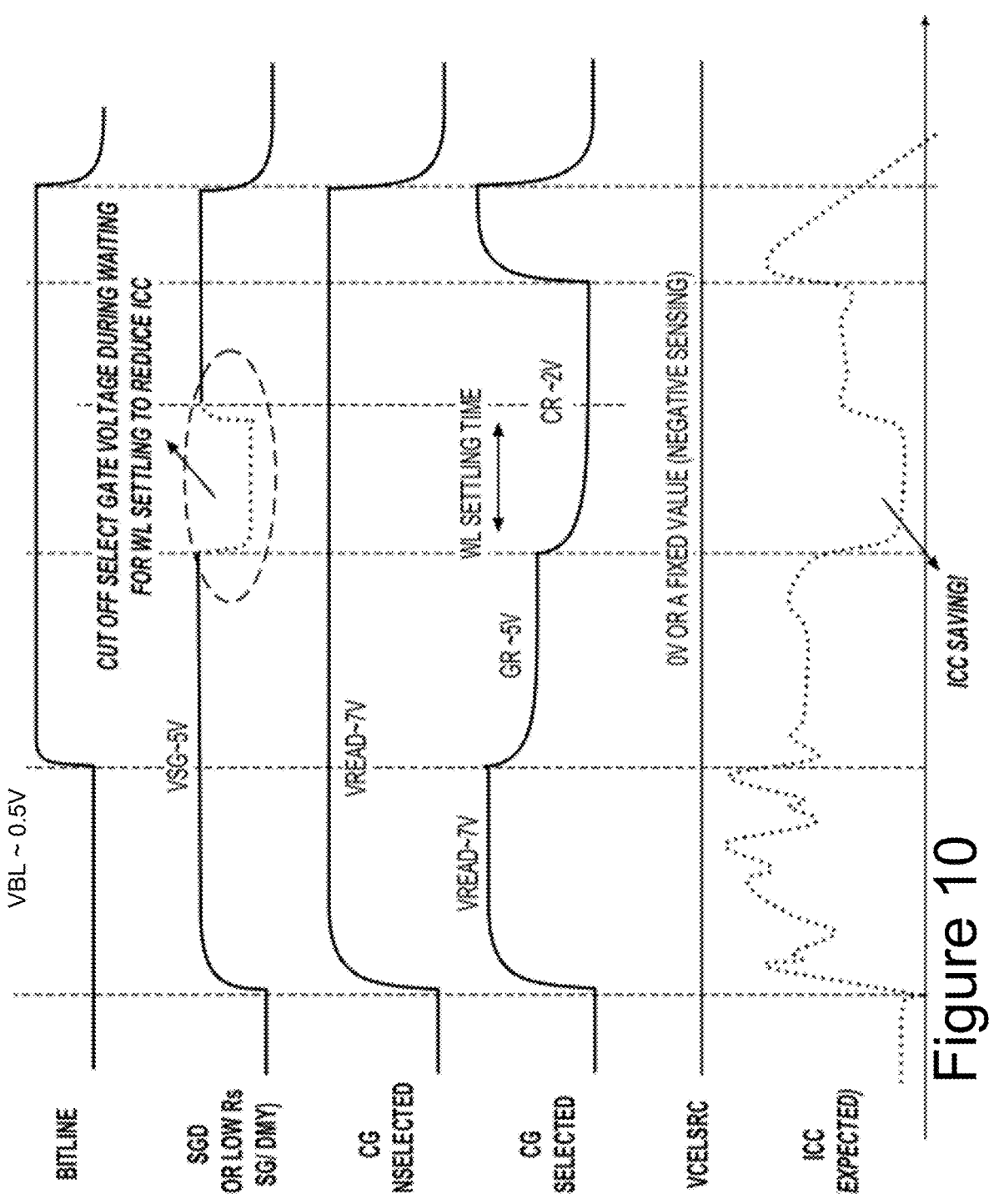
FIG. 10 provides an exemplary embodiment of a waveform of a scheme for temporarily disabling a low resistance select gate for ICC savings during a sensing operation.

FIG. 10 shows another exemplary implementation of a scheme for improving power efficiency. For example, FIG. 10 provides an exemplary embodiment of a waveform of a scheme for temporarily disabling a low resistance select gate for ICC savings during a sensing operation. In FIG. 10, the scheme is described with reference to an upper page read but may be applied to lower and middle page reads during any word line transition period. Additionally, the scheme may also be applied to reverse order read operations and normal order read operations.

In FIG. 10, similar to the waveform in FIG. 6 of a conventional upper page read, read voltages, GR and CR, are applied to selected word lines (CG selected). As shown in FIG. 10, during the application of the voltages GR and CR to the selected word lines, the bit lines connected to the memory cells being read are set to a high voltage supply level VBL, the unselected word lines (CG unselected) are set to a read pass voltage VREAD, and the cell source voltage VCELSRC is 0V or a fixed value (e.g., for negative sensing). In contrast with FIG. 6, in FIG. 10, during GR to CR transition, a select gate (e.g., SGD or at least one low resistance SGD) is reduced to shut off unwanted cell current (Icell), which may significantly reduce ICC. Cutting off select gate voltage while waiting for the word line to settle reduces ICC. As shown in FIG. 10, when the word line is stable, the select gate voltage is ramped up to nominal value to continue sensing CR. Low resistance SG/dummy can be instantaneously shut off. As long as the low resistance select gate RC is less than word line RC, there will not be a performance penalty while saving ICC.

To explore the following in further detail, FIG. 11 will now be described. FIG. 11 depicts a method 1100 for temporarily disabling a low resistance select gate for ICC savings during a sensing operation, in accordance with embodiments described herein. In some embodiments, method 1100 may be implemented by a controller, control circuitry, a processor, and/or the like, as described elsewhere herein. As shown in FIG. 11, method 1100 starts at step 1102. In step 1102, a select gate voltage of a respective select gate, associated with a target memory cell, is ramped up to a first select gate voltage level. For example, with reference to FIGS. 2A and 2B, control circuitry 260 may ramp up a select gate voltage of a respective select gate associated with a target memory cell to a first select gate voltage level.

In FIG. 11, in step 1104, a word line voltage of a word line, associated with a target memory cell of the set of memory cells, transitions from a first word line voltage level to a second word line voltage level. For example, with reference to FIGS. 2A and 2B, control circuitry 260 may transition a word line voltage of a word line associated with a target memory cell from a first word line voltage level to a second word line voltage level.

In FIG. 11, in step 1106, subsequent to transitioning the word line voltage to the second word line voltage level, the select gate voltage of the respective select gate, associated with the target memory cell, is ramped down from the first select gate voltage level to a second select gate voltage level. For example, with continued reference to FIGS. 2A and 2B, control circuitry 260 may ramp down the select gate voltage of the respective select gate associated with the target memory cell from the first select gate voltage level to a second select gate voltage level.

In FIG. 11, in step 1108, prior to sensing a state of the memory cell, the select gate voltage is ramped up from the second select gate voltage level to the first select gate voltage level. For example, with continued reference to FIGS. 2A and 2B, control circuitry 260 may ramp up the select gate voltage from the second select gate voltage level to the first select gate voltage level. In some embodiments, control circuitry 110 may ramp up the select gate voltage from the second select gate voltage level to the first select gate voltage level after the word line has settled to the second word line voltage level.

FIG. 12 shows another exemplary implementation of a scheme for improving power efficiency. For example, FIG. 12 provides an exemplary embodiment of a waveform of a scheme for temporarily increasing source line voltage for ICC savings during a sensing operation. In FIG. 12, the scheme is described with reference to an upper page read but may be applied to lower and middle page reads during any word line transition period. Additionally, the scheme may also be applied to reverse order read operations and normal order read operations.

In FIG. 12, similar to the waveform in FIG. 12 of a conventional upper read operation, read voltages, GR and CR, are applied to selected word lines (CG selected). As shown in FIG. 12, during the application of the voltages GR and CR to the selected word lines, the bit lines connected to the memory cells being read are set to a high voltage supply level VBL, the select gate line SGD is set to the voltage VSG, and the unselected word lines (CG unselected) are set to a read pass voltage VREAD. In contrast with FIG. 12, in FIG. 12, during GR to CR transition, the source voltage level is increased to shut off unwanted Icell, which can significantly reduce ICC. Cutting off the channel of the memory cell is accomplished by increasing the source line voltage during the word line settling period to reduce ICC. When the word line is stable, source voltage is ramped down to a nominal value to continue sensing CR.

Figure 13:
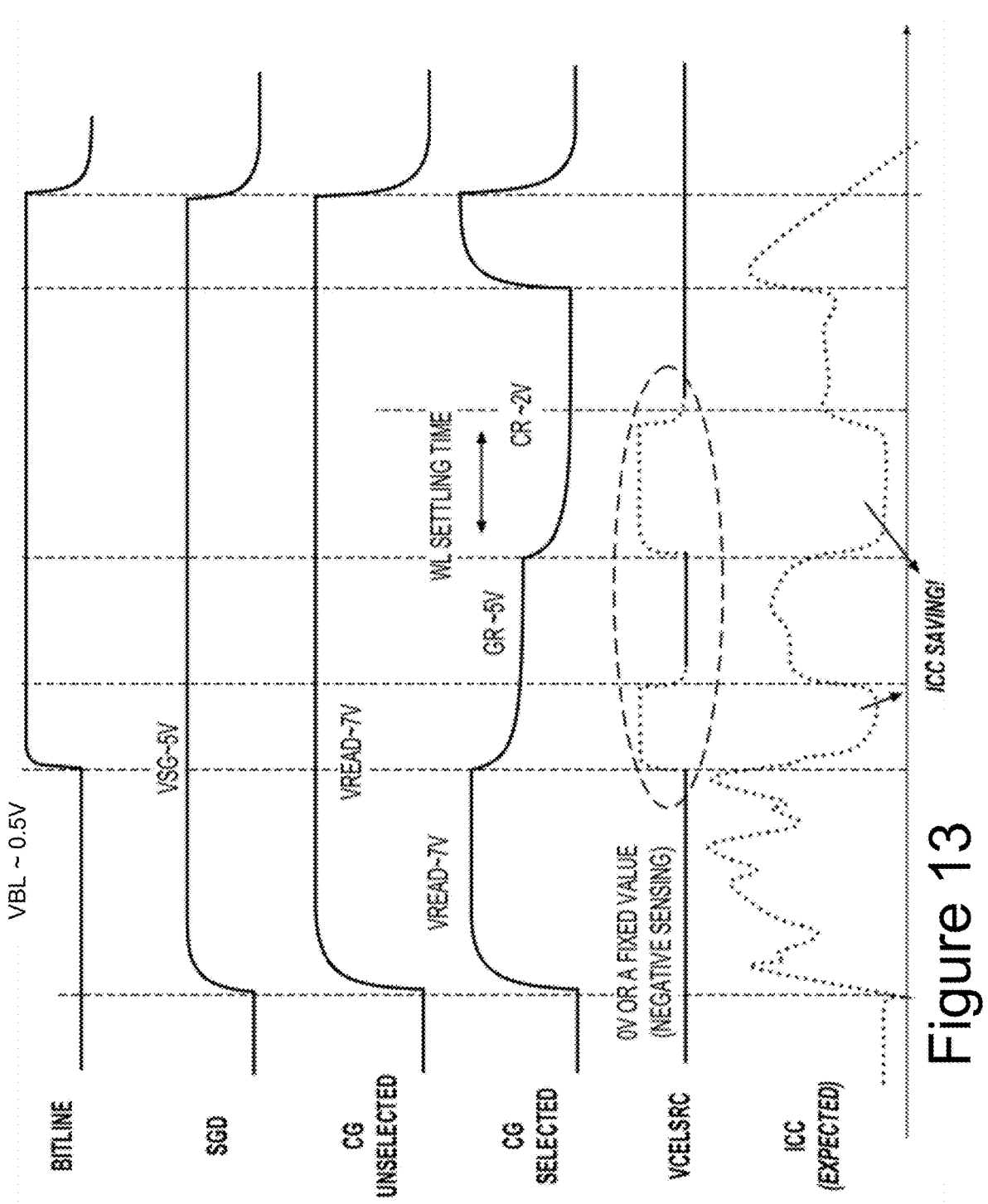
FIG. 13 shows another exemplary implementation of the scheme described with reference to FIG. 12.

For further reduction of ICC, FIG. 13 shows another exemplary implementation of the scheme described with reference to FIG. 12. As seen in FIG. 13, the source line voltage is ramped up at the beginning of the word line settling period after the VREAD to GR transition. This allows for additional read ICC savings. As shown in FIG. 13, the corresponding ICC waveform shows ICC savings during the word line settling time after the VREAD to GR transition.

To explore the following in further detail, FIG. 14 will now be described. FIG. 14 depicts a method 1400 temporarily increasing source line voltage for ICC savings during a sensing operation, in accordance with embodiments described herein. In some embodiments, method 1400 may be implemented by a controller, control circuitry, a processor, and/or the like, as described elsewhere herein. As shown in FIG. 14, method 1400 starts at step 1402. In step 1402, a word line voltage of a word line, associated with a target memory cell of the set of memory cells, transitions from a first word line voltage level to a second word line voltage level. For example, with reference to FIGS. 2A and 2B, control circuitry 260 may transition a word line voltage of a word line associated with a target memory cell from a first word line voltage level to a second word line voltage level.

In FIG. 14, in step 1404, subsequent to transitioning the word line voltage to the second word line voltage level, a source voltage, associated with the target memory cell, is ramped up from a first source voltage level to a second source voltage level. For example, with continued reference to FIGS. 2A and 2B, control circuitry 260 may ramp up a source voltage, associated with the target memory cell, from a first source voltage level to a second source voltage level.

In FIG. 14, in step 1406, prior to sensing a state of the memory cell, the source voltage is ramped down from the second source voltage level to the first source voltage level. For example, with continued reference to FIGS. 2A and 2B, control circuitry 260 may ramp down the source voltage from the second source voltage level to the first source voltage level.

Considering further embodiments such described with respect to FIGS. 7-9 where the bit line voltage is cut off while waiting for the word lines to settle, when this Icc savings mode is used the supply transistor switch for the bit line (bit line clamp, or BLC) turns off between high VBL values, leaving the bit line to float. Although this reduces Icc levels, it can result in more time ramping the bit lines back up to VBL, particularly as lengths increase for bit lines, including for the global bit lines extending across the top of the 3D structure of FIG. 4 to supply the local bit lines of the individual blocks. To reduce this ramp up time, particularly for the far end (relative to the drivers biasing the bit lines) of the bit lines, embodiments presented in the following discussion combine a bit line "kick", or voltage spike, with a preceding bit line float to reduce Icc levels while improving bit line settling as bit lines lengthen and corresponding bit line RC values worsen.

More specifically, the following embodiments modify the bit line float duration in the Icc save mode to enable use of a bit line kick. Rather than floating the bit line during the whole of the word line settling time and then ramping the bit line voltage directly to the VBL value, the float (or low bit line level) time is shortened and followed by a bit line kick before the sensing phase of a read operation occurs. This combination can provide both of Icc savings and an improved bit line settling time.

As bit line lengths increase with die capacity, read timings become longer due to the increased bit line capacitance increasing bit line settling times. Additionally, when precharging a bit line during the initial portion of the read or when moving the selected word line level when, for example, from the GR to the CR control gate level as in FIG. 8, the bit line level might be different depending on the cell current level and bit. This results in worse bit line movement for the larger dies where neighboring bit coupling is worse, as can be illustrated with respect to FIGS. 15 and 16.

Figure 15:
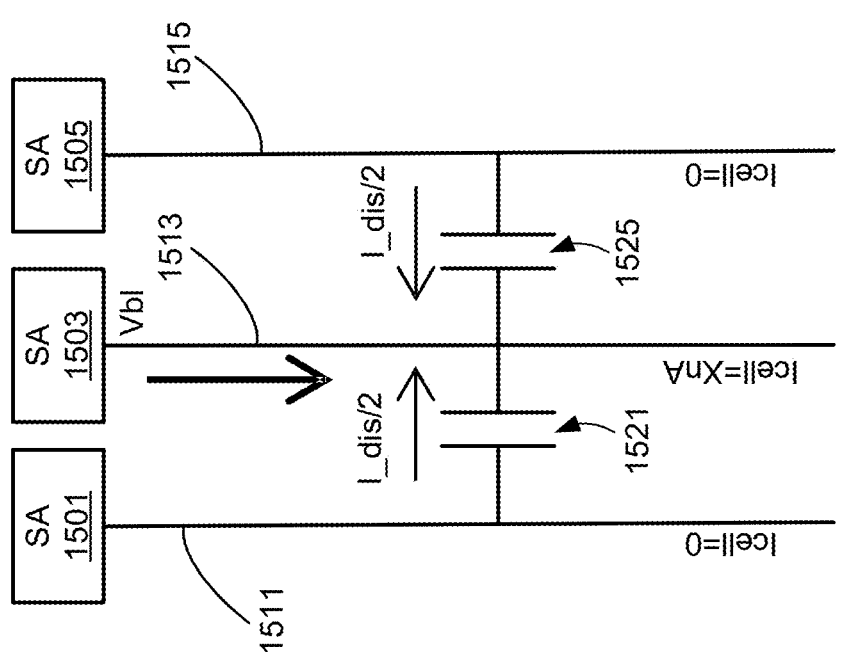
FIG. 15 illustrates the situation for a selected bit line when neighboring bit lines are non-conducting.

FIG. 15 illustrates the situation for a selected bit line when neighboring bit lines are non-conducting. FIG. 15 shows three bit lines 1511, 1513, and 1515 connected to be selectively biased by corresponding sense amplifiers 1501, 1503, and 1505. Bit line 1513 will be capacitively coupled to neighboring bit lines 1511 and 1515 as represented schematically at 1521 and 1525, respectively. In this example, bit lines 1511 and 1515 are non-conducting with current Icell=0, while bit line 1513 is set at Vbl by the sense amplifier 1503 and discharges a current of some number of X nano-amps, Icell=XnA. When neighbor bit lines such as 1511 and 1515 are non-conducting, due to low current levels in the conducting word line 1513 and high capacitance, it takes longer time for the neighbor neighboring bit lines to settle down. This also increases the settling time for the target bit line 1513 due to a displacement current I_dis/2 from the non-conducting neighboring bit lines 1511 and 1513.

Figure 16:
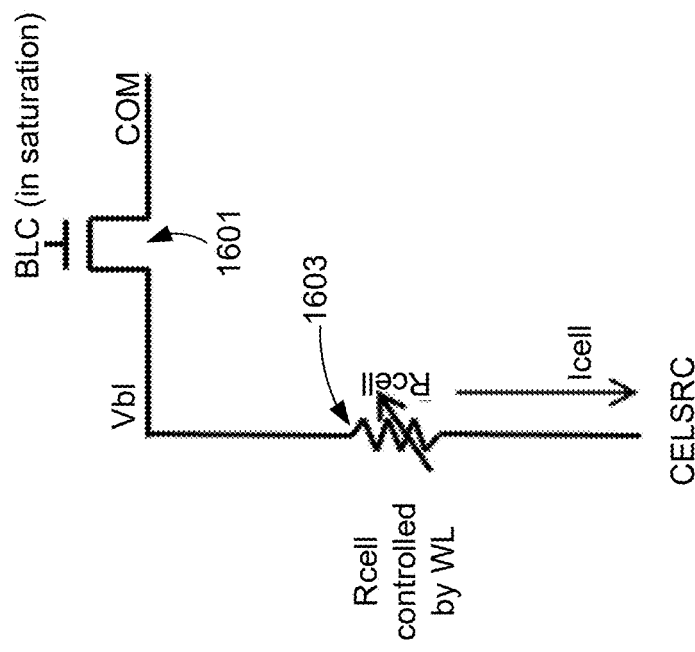
FIG. 16 is a simplified circuit illustrating an embodiment for setting the bit line voltage for a selected bit line.

FIG. 16 is a simplified circuit illustrating an embodiment for setting the bit line voltage for a selected bit line. In FIG. 16, COM is a node inside of the bit line's corresponding sense amplifier, such as SA 1503 for bit line 1513. The COM node passes a voltage Vbl to a selected bit line by turning on the switch of bit line clamp transistor BLC 1601. For a non-selected bit line, the corresponding bit line clamp is off. The cell current Icell is then based on the Vbl level and the resistance Rcell 1603 of the NAND string which depends on the word line voltage level. To be able to more quickly pre-charge neighbor word lines, rather than switching the selected bit line directly to the target Vbl, an initial, higher voltage kick (or spike) can be applied. This can reduce the displacement current and settle the targe bit line more quickly. This is particularly the case of memory dies with higher bit line capacitances, as can be illustrated with respect to FIG. 17.

Figure 17:
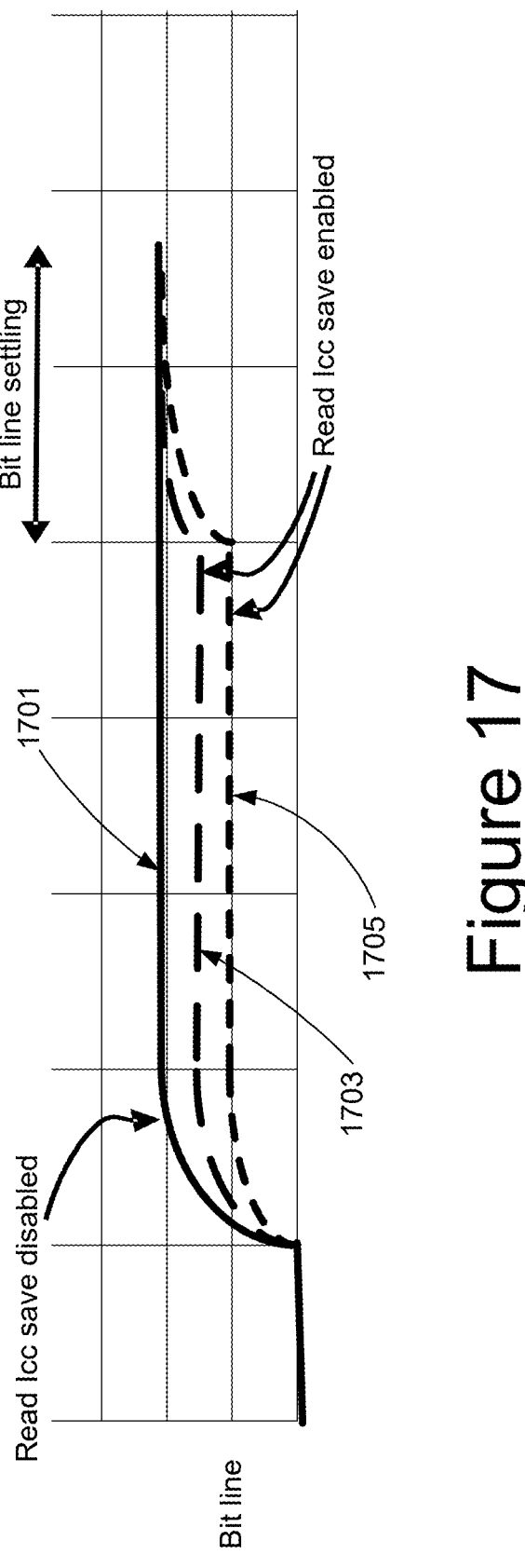
FIG. 17 illustrates the relative amounts of bit line movement for different word line lengths when Read Icc save is enabled.

FIG. 17 illustrates the relative amounts of bit line movement for different word line lengths when Read Icc save is enabled. More specifically, FIG. 17 looks at the bit line waveform of FIG. 6, when Read Icc save is not enabled, and in FIG. 8, when Read Icc save is enabled, for different bit line lengths. In FIG. 17, the bit line is initially at the low level (i.e., ground) and then raised to its target level of Vbl. Waveform 1701 illustrate the case when Read Icc save is disabled, as in FIG. 6, and is ramped up directly to Vbl. Waveforms 1703 and 1705 illustrate the case when Read Icc save is enabled. In both cases, the bit line is floating before ramping up to the target voltage over a bit line settling time. As illustrated at 1705 for the longer, higher capacitance bit line case will be lower than for the lower capacitance bit line at 1703. Consequently, the case of 1705 will take longer to settle and will benefit more from a bit line kick.

Figures 18, 19:
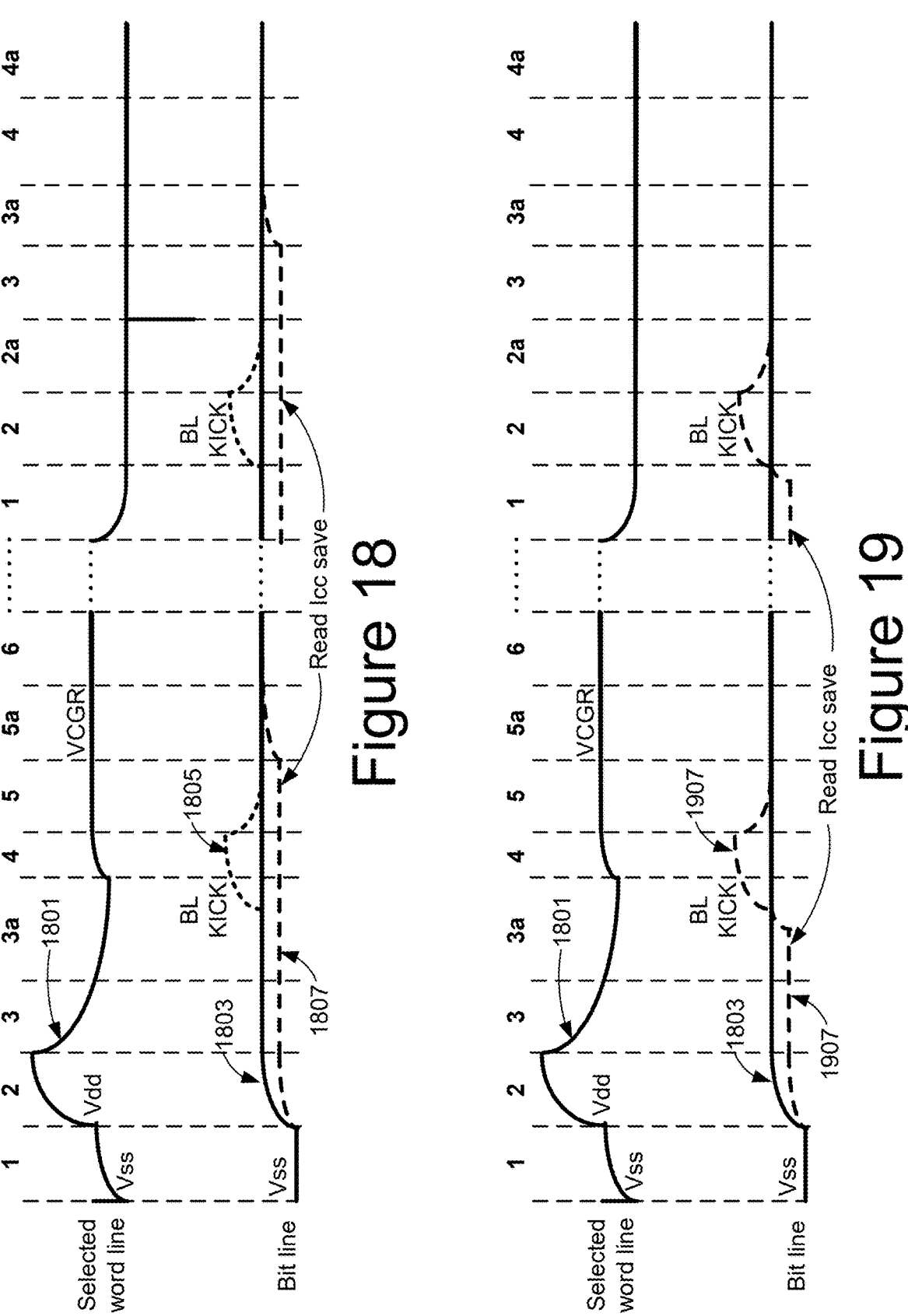
FIGS. 18 and 19 present more detail on embodiments for a selected word line's waveform and bit line waveform with and without a kick, with and with and without read Icc save, and, in FIG. 19, for an embodiment that combines read Icc wave with a bit line kick.

FIGS. 18 and 19 present more detail on embodiments for a selected word line's waveform and bit line waveform with and without a kick, with and with and without read Icc save, and, in FIG. 19, for an embodiment that combines read Icc wave with a bit line kick. FIGS. 18 and 19 also include a set of references number across the top for phases of the operation. For the selected word line waveform 1801 at the top of FIG. 18, this can be similar to that of examples above, such as FIG. 6 or FIG. 8. In these embodiments, during interval 1, the selected word line initial ramps up from Vss to Vdd, and then further ramps to a pre-charge level in interval 2. Non-selected word lines would also be ramped up to the read pass voltage during this time. During intervals 3 and 3a, the selected word line is ramped down to below or near the read voltage, here labelled VCGR, to which it is then ramped up during interval 4 and allowed to settle during intervals 5 and 5a. The sensing for the read level VCGR follows at interval 6. Sensing at a second read voltage can then follow, ramping down at the subsequent interval 1, before settling and being sensed.

Looking now at the bit line in FIG. 18. The solid waveform 1803 corresponds to the case when neither Read Icc saving or a bit line kick not enabled, as in FIG. 6, and in interval 1 raises from Vss to the target Vbl, where it stays for the remainder of the shown intervals. To aid in settling the bit lines while the word line is settling at the read voltage, the bit line kick 1805 can be applied to help settle the full length of the bit lines at the target voltage more quickly, which, as discussed above, is particularly useful for higher capacitance bit lines.

FIG. 18 also shows when Read Icc save is enabled for the bit lines, as in the embodiments of FIG. 7 or 8. As illustrated in the broken waveform 1807, during intervals 2 through 5, the bit line is left floating by turning off the corresponding bit line clamp (BLC 1601 in FIG. 16), thereby saving current as described above. During interval 5a, the bit line clamp is turned on to set the selected bit line sensing voltage at Vbl. Once the bias levels are set and settled, the sensing operation is performed at interval 6. The second sensing in the subsequent intervals follows similarly. Although the waveform 1807 saves on Icc, as the bit line is left to float until interval 5a, it is not compatible with also having a bit line kick 1805 while the word line read level is being established and settled.

FIG. 19 presents waveforms for an embodiment of Rad Icc save that also incorporates a bit line kick. In FIG. 19, the selected word line waveform 1801 is as before. For reference, the bit line waveform 1803 when neither Read Icc save nor a kick are enabled is repeated from FIG. 18. The waveform 1907 illustrates an embodiment of Read Icc save that incorporates a bit line kick. During intervals 2, 3, and the first portion of interval 3a while the selected word line is still discharging, the bit line is again floating. Now, however, the interval 3a, bit line is now actively biased through the bit line clamp to raise its voltage level and then apply the bit line kick, after which the bit line drops back down to the target bit line voltage in interval 5. This can provide both the benefits of the bit line kick as discussed above, while also saving Icc. The combined bit line float and kick can then follow again in the next set of intervals. In some embodiments, the duration of the bit line float duration can be settable based on a parameter, such as having a disable value (as in the waveform 1803); a longer float duration (with no kick) as in waveform 1807; a combined shorter float duration with a kick (as in waveform 1907); or by using the combined float and kick in the first sensing (e.g., GR read), but no float in the second sensing (e.g., CR read).

FIG. 20 is a flowchart for the operation of a non-volatile memory device that includes both the Read Icc savings technique and a bit link kick in a read operation. Starting at step 2001, a memory cell, such as from the non-volatile memory structures described above with respect to FIGS. 1-5B, is selected for a sensing operation. In step 2003, the word line connected to the selected memory cell is biased to an initial voltage level (corresponding to intervals 1 and 2) and subsequently discharged (corresponding to interval 3 and 3a) from the initial voltage level toward a voltage level below a first sensing voltage by the row control circuitry 220 including array drivers 224, where the initial voltage level being higher than the first sensing voltage. While the word line ramps to the initial voltage level and subsequently discharges, in step 2005 the column control circuitry sets the bit line connected to the selected memory cell to float as illustrated in FIG. 19. Subsequent to the first word line discharging to the voltage level below the first sensing voltage, at step 2007 row control circuitry 220 including array drivers 224 biases (at interval 4) the word line at the first sensing voltage. While the word line ramps up from the voltage level below the first sensing voltage to the first sensing voltage in response to the biasing of the first word line to the first sensing voltage, the column control circuitry 210 including driver circuitry 214 applies a voltage spike of kick to the first bit line in step 2009.

In step 2011, while biasing the word line at the first sensing voltage and subsequent to first word line ramping from the voltage level below the first sensing voltage to the first sensing voltage, row control circuitry 220 allows the first word line to settle (intervals 5 and 5a). While the word line is biased at the first sensing voltage and subsequent to being allowed to settle, at step 2013 the sensing circuitry can determine (during interval 6) a state of the selected memory cell based on an amount of current flowing from the bit line through the selected memory cell. While the first word line is settling, step 2015 allows the first bit line to discharge from the voltage spike to a selected bit line sensing voltage as set by the column control circuitry 210 including the driver circuits 214, which, in step 2017, is maintained while determining the first state of the selected memory cell.

In view of the foregoing, an embodiment includes a non-volatile memory apparatus, comprising a control circuit configured to connect to a memory structure comprising a plurality of memory cells each connected along a corresponding word line and to a corresponding bit line. To read a selected memory cell connected along a selected word line and to a selected bit line, the control circuit is configured to: bias the selected word line to a first sensing voltage; while biased at the first sensing voltage, allow the selected word line to settle; while the selected word line biased at the first sensing voltage and subsequent to being allowed to settle, determine a first state of the selected memory cell based on an amount of current flowing from the selected bit line through the selected memory cell; prior to biasing the selected word line to the first sensing voltage, bias the selected word line to an initial voltage level higher than the first sensing voltage and subsequently allowing the selected word line to discharge from the initial voltage level towards the first sensing voltage; while the selected word line is ramping towards the initial voltage and subsequently discharging toward the first sensing voltage, set the selected bit line to float; concurrently with initially biasing the selected word line to the first sensing voltage, applying a voltage spike to the selected bit line; while the selected word line is settling, allow the corresponding bit line to discharge from the voltage spike to a selected bit line sensing voltage; and while determining the first state of the selected memory cell, bias the selected bit line at the selected bit line sensing voltage.

An embodiment includes a method comprising: selecting a non-volatile memory cell of a memory structure comprising a plurality of non-volatile memory cells for a sensing operation; biasing a first word line connected to a selected memory cell to an initial voltage level and subsequently allowing the first word line to discharge from the initial voltage level toward a voltage level below a first sensing voltage, the initial voltage level being higher than the first sensing voltage; while the first word line ramps to the initial voltage level and subsequently discharges, setting a first bit line connected to the selected memory cell to float; subsequent to the first word line discharging to the voltage level below the first sensing voltage, biasing the first word line at the first sensing voltage; while the first word line ramps from the voltage level below the first sensing voltage to the first sensing voltage in respect the biasing of the first word line to the first sensing voltage, applying a voltage spike to the first bit line; while biasing the first word line at the first sensing voltage, subsequent to the first word line ramping from the voltage level below the first sensing voltage to the first sensing voltage, allowing the first word line to settle; while the first word line is biased at the first sensing voltage and subsequent to being allowed to settle, determining a first state of the selected memory cell based on an amount of current flowing from the first bit line through the selected memory cell; while the first word line is settling, allowing the first bit line to discharge from the voltage spike to a selected bit line sensing voltage; and while determining the first state of the selected memory cell, biasing the first bit line at the selected bit line sensing voltage.

An embodiment includes a non-volatile memory apparatus, comprising: an array of non-volatile memory cells each connected along a corresponding word line and a corresponding bit line; and one or more control circuits. The one or more control circuits include word line driver circuitry and bit line driver circuitry. The word line driver circuitry is configured to: bias a word line connected to a selected memory cell to an initial voltage level and subsequently allow the word line connected to a selected memory cell to discharge from the initial voltage level toward a voltage level below a first sensing voltage, the initial voltage level being higher than the first sensing voltage; subsequent to the word line connected to the selected memory cell discharging to the voltage level below the first sensing voltage, bias the word line connected to the selected memory cell the first sensing voltage; and while biasing the word line connected to a selected memory cell at the first sensing voltage and subsequent to the word line connected to the selected memory cell ramping from the voltage level below the first sensing voltage to the first sensing voltage, allowing the word line connected to the selected memory cell to settle. The bit line driver circuitry is configured to: while the word line connected to the selected memory cell ramps to the initial voltage level and subsequently discharges, set a bit line connected to the selected memory cell to float; while the word line connected to the selected memory cell ramps from the voltage level below the first sensing voltage to the first sensing voltage in respect the biasing of the word line connected to the selected memory cell to the first sensing voltage, apply a voltage spike to the bit line connected to the selected memory cell; and subsequent to applying the voltage spike to the bit line connected to the selected memory cell, bias the bit line connected to the selected memory cell at a selected bit line sensing voltage. The control circuit is configured to: while the word line connected to the selected memory cell is biased at the first sensing voltage and subsequent to being allowed to settle and while the bit line connected to the selected memory cell is biased at the selected bit line sensing voltage, determine a state of the selected memory cell based on an amount of current flowing from the bit line connected to the selected memory cell through the selected memory cell.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-transitory non-volatile memory apparatus, comprising:

a control circuit configured to connect to a memory structure comprising a plurality of memory cells each connected along a corresponding word line and to a corresponding bit line, where, to read a selected memory cell connected along a selected word line and to a selected bit line, the control circuit is configured to:

bias the selected word line to a first sensing voltage;

while biased at the first sensing voltage, allow the selected word line to settle;

with the selected word line biased at the first sensing voltage and subsequent to being allowed to settle, determine a first state of the selected memory cell based on an amount of current flowing from the selected bit line through the selected memory cell;

prior to biasing the selected word line to the first sensing voltage, bias the selected word line to an initial voltage level higher than the first sensing voltage and subsequently allowing the selected word line to discharge from the initial voltage level towards the first sensing voltage;

while the selected word line is ramping towards the initial voltage and subsequently discharging toward the first sensing voltage, set the selected bit line to float;

concurrently with initially biasing the selected word line to the first sensing voltage, applying a voltage spike to the selected bit line;

while the selected word line is settling, allow the corresponding bit line to discharge from the voltage spike to a selected bit line sensing voltage; and while determining the first state of the selected memory cell, bias the selected bit line at the selected bit line sensing voltage.

2. The non-transitory non-volatile memory apparatus of claim 1, wherein at least a portion of the control circuit is formed on a control die, the non-volatile memory apparatus further comprising:

a memory die including the memory structure, the memory die separate from and bonded to the control die.

3. The non-transitory non-volatile memory apparatus of claim 1, wherein the control circuit comprises:

a sense amplifier circuit configured to bias the selected bit line; and a bit line switch through which the sense amplifier circuit is connectable to the selected bit line.

4. The non-transitory non-volatile memory apparatus of claim 3, wherein:

to set the selected bit line to float, the control circuit is configured to turn the bit line switch off; and to bias the selected bit line to the bit line sensing voltage, the control circuit is configured to turn the bit line switch on.

5. The non-transitory non-volatile memory apparatus of claim 1, wherein the memory structure has a NAND architecture and the control circuit is further configured to:

concurrently with biasing the selected word line to an initial voltage level higher than the first sensing voltage, biasing unselected word lines of the memory structure to a read pass voltage.

6. The non-transitory non-volatile memory apparatus of claim 5, further comprising:

the memory structure, wherein the memory structure has a three-dimensional NAND architecture.

7. The non-transitory non-volatile memory apparatus of claim 1, wherein to bias the selected word line to an initial voltage level higher than the first sensing voltage, the control circuit is further configured to:

bias the selected word line to an intermediate voltage level between ground and the initial voltage level; and

subsequent to biasing the selected word line to the inter-
mediate voltage level, biasing the selected word line to
the initial voltage level.

8. The non-transitory non-volatile memory apparatus of
claim 1, wherein, subsequent to determining the first state of
the selected memory cell, the control circuit is further
configured to:
bias the selected word line to a second sensing voltage;
while the selected word line is biased at the second
sensing voltage, allow the selected word line to settle;
while biased at the second sensing voltage and subsequent
to being allowed to settle, determine a second state of
the selected memory cell based on an amount of current
flowing from the selected bit line through the selected
memory cell;
prior to biasing the selected word line to the second
sensing voltage, allowing the selected word line to
discharge towards the second sensing voltage;
while the selected word line is discharging toward the
second sensing voltage, set the selected bit line to float;
concurrently with initially biasing the selected word line
to the second sensing voltage, applying a voltage spike
to the selected bit line; and
while the selected word line is settling, allow the selected
bit line to discharge to a selected bit line sensing
voltage.

9. The non-transitory non-volatile memory apparatus of
claim 8, wherein the memory cells are multi-level memory
cells configured to store data in a multipage format, and
wherein the first sensing voltage and the second sensing
voltage are configured to determine a data value of the
selected memory cell for a page of the multipage format.

10. The non-transitory non-volatile memory apparatus of
claim 9, wherein the control circuit is further configured to:
prior to reading the selected memory cell, programing the
data value to the selected memory cell.

11. A method, comprising:
selecting a non-volatile memory cell of a memory struc-
ture comprising a plurality of non-volatile memory
cells for a sensing operation;
biasing a first word line connected to a selected memory
cell to an initial voltage level and subsequently allow-
ing the first word line to discharge from the initial
voltage level toward a voltage level below a first
sensing voltage, the initial voltage level being higher
than the first sensing voltage;
while the first word line ramps to the initial voltage level
and subsequently discharges, setting a first bit line
connected to the selected memory cell to float;
subsequent to the first word line discharging to the voltage
level below the first sensing voltage, biasing the first
word line at the first sensing voltage;
while the first word line ramps from the voltage level
below the first sensing voltage to the first sensing
voltage in respect the biasing of the first word line to
the first sensing voltage, applying a voltage spike to the
first bit line;
while biasing the first word line at the first sensing
voltage, subsequent to the first word line ramping from
the voltage level below the first sensing voltage to the
first sensing voltage, allowing the first word line to
settle;
while the first word line is biased at the first sensing
voltage and subsequent to being allowed to settle,
determining a first state of the selected memory cell
based on an amount of current flowing from the first bit
line through the selected memory cell;

30 while the first word line is settling, allowing the first bit
line to discharge from the voltage spike to a selected bit
line sensing voltage; and
while determining the first state of the selected memory
cell, biasing the first bit line at the selected bit line
sensing voltage.

12. The method of claim 11, wherein biasing the first bit
line at the selected bit line sensing voltage includes:
biasing the selected first bit line at the selected bit line
sensing voltage by a sense amplifier circuit.

13. The method of claim 12, wherein the sense amplifier
circuit is connected to the first bit line though a bit line
switch, and
wherein setting the first bit line connected to the selected
memory cell to float includes setting the bit line switch
to be off.

14. The method of claim 11, wherein the memory struc-
ture has a NAND architecture and the method further
comprises:
concurrently with biasing the first word line to an initial
voltage level higher than the first sensing voltage,
biasing unselected word lines of the memory structure
to a read pass voltage.

15. The method of claim 11, biasing the first word line to
an initial voltage level higher than the first sensing voltage
comprises:
biasing the first word line to an intermediate voltage level
between ground and the initial voltage level; and
subsequent to biasing the first word line to the interme-
diate voltage level, biasing the first word line to the
initial voltage level.

16. The method of claim 11, further comprising subse-
quent to determining the first state of the selected memory
cell:
biasing the first word line to a second sensing voltage;
while biased at the second sensing voltage, allowing the
first word line to settle;
while the first word line biased at the second sensing
voltage and subsequent to being allowed to settle,
determining a second state of the selected memory cell
based on an amount of current flowing from the first bit
line through the selected memory cell;
prior to biasing the first word line to the second sensing
voltage, allowing the first word line to discharge
towards the second sensing voltage;
while the first word line is discharging toward the second
sensing voltage, setting the first bit line to float;
concurrently with initially biasing the first word line to the
second sensing voltage, applying a voltage spike to the
first bit line; and
while the first word line is settling, allowing the first bit
line to discharge to a selected bit line sensing voltage.

17. The method of claim 16, wherein the memory cells are
multi-level memory cells configured to store data in a
multipage format, and wherein the first sensing voltage and
the second sensing voltage are configured to determine a
data value of the selected memory cell for a page of the
multipage format.

18. A non-transitory non-volatile memory apparatus,
comprising:
an array of non-volatile memory cells each connected
along a corresponding word line and a corresponding
bit line; and
one or more control circuits, comprising:
word line driver circuitry configured to:
bias a word line connected to a selected memory cell
to an initial voltage level and subsequently allow the word line connected to a selected memory cell to discharge from the initial voltage level toward a voltage level below a first sensing voltage, the initial voltage level being higher than the first sensing voltage;

subsequent to the word line connected to the selected memory cell discharging to the voltage level below the first sensing voltage, bias the word line connected to the selected memory cell the first sensing voltage; and while biasing the word line connected to a selected memory cell at the first sensing voltage and subsequent to the word line connected to the selected memory cell ramping from the voltage level below the first sensing voltage to the first sensing voltage, allowing the word line connected to the selected memory cell to settle; and bit line driver circuitry configured to:

while the word line connected to the selected memory cell ramps to the initial voltage level and subsequently discharges, set a bit line connected to the selected memory cell to float;

while the word line connected to the selected memory cell ramps from the voltage level below the first sensing voltage to the first sensing voltage in respect the biasing of the word line connected to the selected memory cell to the first sensing voltage, apply a voltage spike to the bit line connected to the selected memory cell; and subsequent to applying the voltage spike to the bit line connected to the selected memory cell, bias the bit line connected to the selected memory cell at a selected bit line sensing voltage, the control circuit configured to:

while the word line connected to the selected memory cell is biased at the first sensing voltage and subsequent to being allowed to settle and while the bit line connected to the selected memory cell is biased at the selected bit line sensing voltage, determine a state of the selected memory cell based on an amount of current flowing from the bit line connected to the selected memory cell through the selected memory cell.

19. The non-transitory non-volatile memory apparatus of claim 18, wherein the one or more control circuits further comprise:

a sense amplifier circuit; and a bit line switch connecting the sense amplifier to the bit line connected to the selected memory cell, wherein, to set the bit line connected to the selected memory cell to float, the one or more control circuits are configured to turn the bit line switch off, wherein to bias the bit line connected to the selected memory cell at the selected bit line sensing voltage the one or more control circuit are configured to turn the bit line select switch on and bias the bit line connected to the selected memory cell by the sense amplifier circuit, and wherein the sense amplifier circuit is configured to determine the state of the selected memory cell based on an amount of current flowing from the bit line connected to the selected memory cell through the selected memory cell.

20. The non-transitory non-volatile memory apparatus of claim 18, wherein the array of non-volatile memory cells has a NAND structure and the word line driver circuitry is further configured to:

concurrently with biasing the word line connected to the selected memory cell to an initial voltage level higher than the first sensing voltage, biasing unselected word lines of the array of non-volatile memory cells to a read pass voltage.

* * * * *